United States Patent
Cao

(10) Patent No.: US 6,363,184 B2
(45) Date of Patent: Mar. 26, 2002

(54) METHOD AND APPARATUS FOR CHROMATIC DISPERSION COMPENSATION AND DISPERSION SLOPE COMPENSATION IN WAVELENGTH DIVISION MULTIPLEXED SYSTEMS UTILIZING A CHANNEL SEPARATOR AND VIRTUALLY IMAGED PHASED ARRAYS

(75) Inventor: Simon X. F. Cao, San Mateo, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/844,025

(22) Filed: Apr. 27, 2001

Related U.S. Application Data

(63) Continuation of application No. 09/470,949, filed on Dec. 22, 1999.

(51) Int. Cl.[7] .................................................. G02B 6/28
(52) U.S. Cl. ............................ 385/24; 385/37; 385/11; 359/124; 359/130; 359/161
(58) Field of Search ........................... 385/24, 28, 37; 359/161, 124, 127, 130

(56) References Cited

U.S. PATENT DOCUMENTS

| | | | |
|---|---|---|---|
| 4,750,802 A | * 6/1988 | Bhagavatula | 385/33 |
| 5,930,045 A | 7/1999 | Shirasaki | 359/577 |
| 5,969,865 A | * 10/1999 | Shirasaki | 359/577 |
| 5,969,866 A | 10/1999 | Shirasaki | 359/577 |
| 5,973,838 A | 10/1999 | Shirasaki | 359/577 |
| 5,999,320 A | 12/1999 | Shirasaki | 359/577 |
| 6,028,706 A | 2/2000 | Shirasaki | 359/577 |
| 6,043,914 A | * 3/2000 | Cook | 359/124 |
| 6,137,604 A | * 10/2000 | Bergano | 359/124 |

\* cited by examiner

*Primary Examiner*—Darren Schuberg
*Assistant Examiner*—Leo Boutsikaris
(74) *Attorney, Agent, or Firm*—Sawyer Law Group LLP

(57) ABSTRACT

The present invention provides a method and apparatus for an improved chromatic dispersion compensator. In an apparatus aspect, the present invention includes a channel separator for separating a wavelength division multiplexed light comprising a plurality of channels, the plurality of channels containing undesired chromatic dispersion and dispersion slope; and a plurality of partial-channel-set dispersion compensation devices optically coupled to the channel separator in a cascade arrangement, wherein each partial-channel-set dispersion compensation device includes: a virtually imaged phased array (VIPA) optically coupled to the channel separator, and a light returning device optically coupled to the VIPA, wherein a combination of the VIPA and the light returning device compensates for the undesired chromatic dispersion and dispersion slope by propagating each wavelength of the plurality of channels along a different path length. The controlled difference between the periodicity of each VIPA's group delay response and the periodicity of the channel spacing causes the light of each channel input to the VIPA to acquire a different value of chromatic dispersion from that of every other channel input to the same VIPA, which is utilized so as to compensate dispersion slope. Advantages in using this chromatic dispersion compensator includes tunability, adaptability to various fiber types or optical transmission regions with either positive or negative dispersion, smaller size and lower cost. Also, the present invention provides the capability of simultaneously providing different values of dispersion compensation to different channels, i.e., it is capable of correcting for dispersion slope.

16 Claims, 18 Drawing Sheets

METHOD AND APPARATUS FOR CHROMATIC DISPERSION COMPENSATION AND DISPERSION SLOPE COMPENSATION IN WAVELENGTH DIVISION MULTIPLEXED SYSTEMS UTILIZING A CHANNEL SEPARATOR AND VIRTUALLY IMAGED PHASED ARRAYS

CROSS-REFERENCE TO RELATED APPLICATIONS

This application is a Continuation of co-pending U.S. patent application Ser. No. 09/470,949, entitled "Method And Apparatus For Chromatic Dispersion Compensation And Dispersion Slope Compensation In Wavelength Division Multiplexed Systems Utilizing A Channel Separator And Virtually Imaged Phased Arrays," filed on Dec. 22, 1999.

FIELD OF THE INVENTION

The present invention relates to wavelength division multiplexed optical fiber communications systems, and more particularly to the compensation for chromatic dispersion in such systems.

BACKGROUND OF THE INVENTION

Fiber optic networks are becoming increasingly popular for data transmission due to their high speed, high capacity capabilities. A common and well known problem in the transmission of optical signals is chromatic dispersion of the optical signal. Chromatic dispersion refers to the effect where the channels within a signal travel through an optic fiber at different speeds, i.e., longer wavelengths travel faster than shorter wavelengths. This problem becomes more acute for data transmission speeds higher than 2.5 gigabytes per second. The resulting pulses of the signal will be stretched, possibly overlap, making it more difficult for a receiver to distinguish where one pulse begins and another ends. This seriously compromises the integrity of the signal. Therefore, for a fiber optic communications system to provide a high transmission capacity, the fiber optic communications system must compensate for chromatic dispersion.

The exact value of the chromatic dispersion produced in a channel of a wavelength-division multiplexed fiber optic communications system depends upon several factors, including the type of fiber and the wavelength of the channel. FIG. 1 illustrates the graphs of Group Velocity Dispersion, D, against wavelength, of three conventional fiber transmission bands, or transmission windows, and conventional fiber types which operate in these bands. For example, single-mode or non-dispersion shifted fibers (NDSF) operate in the 1.3 µm region, and dispersion shifted fibers (DSF) are optimized for single channel signal transmission in the C-Band. With the development of wavelength-division multiplexed (WDM) fiber optic communications systems, where several signal channels, each channel comprising a different wavelength band within the C-Band, are simultaneously propagated along a span of an individual fiber, "non-zero dispersion shifted fibers" (NZ-DSF) were developed. The NZ-DSF has zero-dispersion at the edge of or outside of the C-Band, and moderately low non-zero dispersion in the region of the C-Band.

Because all three fiber types are deployed in telecommunications systems, the requirements for dispersion compensators vary widely. A constant level of dispersion compensation does not accurately negate the dispersion of all channels. This inaccuracy can become a significant problem for high-speed data propagation, long span distances, and/or wide distances between the shortest and longest wavelength channels.

Some conventional dispersion compensators attempt to solve this problem, including dispersion compensation fibers, chirped fiber Bragg gratings coupled to optical circulators, and conventional diffraction gratings disposed as sequential pairs.

A dispersion compensation fiber, which is used in-line within a fiber communications system, has a special cross-section index profile so as to provide chromatic dispersion that is opposite to that of ordinary fiber within the system. The summation of the two opposite types of dispersion negates the chromatic dispersion of the system. However, dispersion compensation fiber is expensive to manufacture, has a relatively large optical attenuation, and must be relatively long to sufficiently compensate for chromatic dispersion. For example, if an optical fiber is 100 km in length, then a dispersion compensation fiber should be approximately 20 to 30 km in length. Furthermore, dispersion compensation fiber is not available to compensate for the negative chromatic dispersion of DSF and NZ-DSF lines in the 1.3 µm band.

A chirped fiber Bragg grating is a special fiber with spatially modulated refractive index that is designed so that longer (shorter) wavelength components are reflected at a farther distance along the chirped fiber Bragg grating than are the shorter (longer) wavelength components. A chirped fiber Bragg grating of this sort is coupled to a fiber communications system through an optical circulator. By causing certain wavelength components to travel longer distances than other wavelength components, a controlled delay is added to those components and opposite dispersion can be added to a pulse. Unfortunately, a chirped fiber Bragg grating has a very narrow bandwidth for reflecting pulses, and therefore cannot provide a wavelength band sufficient to compensate for light including many wavelengths, such as a wavelength division multiplexed light. A number of chirped fiber Bragg gratings may be cascaded for wavelength multiplexed signals, but this results in an expensive system.

A conventional diffraction grating has the property that different wavelengths are output from itself at different angles. By using a pair of gratings in a coupled spatial arrangement, this property can be used to compensate chromatic dispersion in a fiber communications system. In such a spatial grating pair arrangement, lights of different wavelengths are diffracted from a first grating at different angles. These lights are then input to a second grating which diffracts them a second time so as to set their pathways parallel to one another. Because the different lights travel with different angles between the two gratings, certain wavelength components are made to travel longer distances than other wavelength components. Chromatic dispersion is produced in the spatial grating pair arrangement because the wavelength components that travel the longer distances incur time delays relative to those that travel the shorter distances. This grating-produced chromatic dispersion can be made to be opposite to that of the fiber communications system, thereby compensating the chromatic dispersion within the system. However, the dispersion produced by a practical spatial grating pair arrangement is extremely small and is not large enough to compensate for the relatively large amount of chromatic dispersion occurring in a fiber optic communication system. Therefore, to compensate for chromatic dispersion occurring in a fiber optic communication system, the two gratings of a spatial grating pair would have to be separated by a very large distance, thereby making such a spatial grating pair arrangement impractical.

Accordingly, there exists a need for an improved chromatic dispersion compensator The improved chromatic dispersion compensator should be practical for compensating for chromatic dispersion accumulated in an optical fiber, and should be readily adaptable to either positive or negative chromatic dispersion, and which can provide non-uniform dispersion compensation so as to compensate for fiber dispersion slope so as to accurately compensate chromatic dispersion in each of the WDM channels throughout a wide wavelength range. The present invention addresses such a need.

SUMMARY OF THE INVENTION

The present invention provides a method and apparatus for an improved chromatic dispersion compensator. In an apparatus aspect, the present invention includes a channel separator for separating a wavelength division multiplexed light comprising a plurality of channels, the plurality of channels containing undesired chromatic dispersion and dispersion slope; and a plurality of partial-channel-set dispersion compensation devices optically coupled to the channel separator in a cascade arrangement, wherein each partial-channel-set dispersion compensation device includes: a virtually imaged phased array (VIPA) optically coupled to the channel separator, and a light returning device optically coupled to the VIPA, wherein a combination of the VIPA and the light returning device compensates for the undesired chromatic dispersion and dispersion slope by propagating each wavelength of the plurality of channels along a different path length. The controlled difference between the periodicity of each VIPA's group delay response and the periodicity of the channel spacing causes the light of each channel input to the VIPA to acquire a different value of chromatic dispersion from that of every other channel input to the same VIPA, which is utilized so as to compensate dispersion slope. Advantages in using this chromatic dispersion compensator includes tunability, adaptability to various fiber types or optical transmission regions with either positive or negative dispersion, smaller size and lower cost. Also, the present invention provides the capability of simultaneously providing different values of dispersion compensation to different channels, i.e., it is capable of correcting for dispersion slope.

DETAILED DESCRIPTION

The present invention provides an improved chromatic dispersion compensator. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 14 in conjunction with the discussion below.

Figure 2:
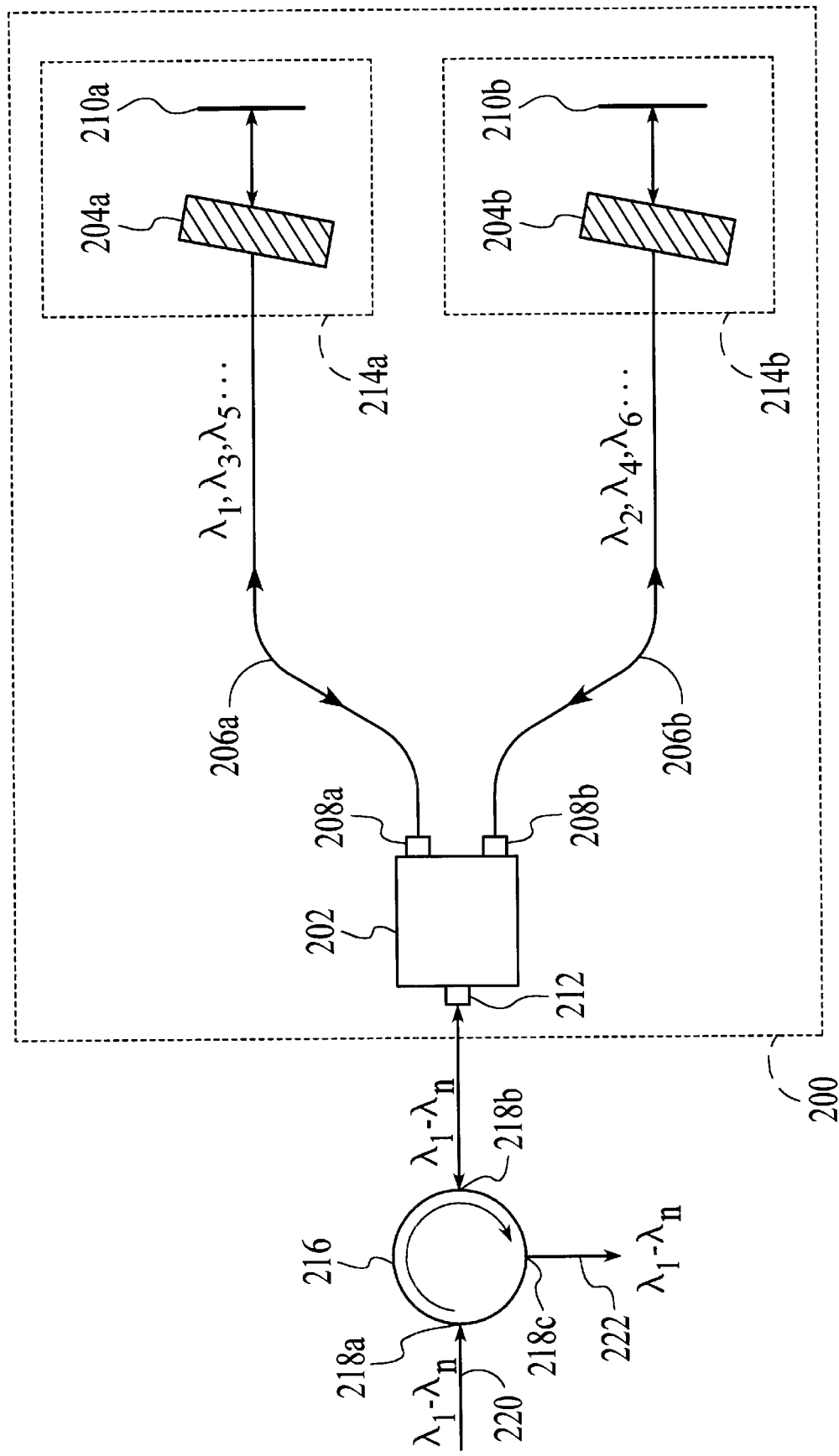
FIG. 2 illustrates a preferred embodiment of a chromatic dispersion compensator in accordance with the present invention.

FIG. 2 illustrates a preferred embodiment of a chromatic dispersion compensator in accordance with the present invention. In FIG. 2, the dispersion compensator 200 is comprised of a channel separator 202 that is optically coupled to both a first 204a and a second 204b virtually imaged phased array (VIPA) through a first 206a and a second 206b optical coupling, respectively, where the optical couplings 20a–206b are coupled to a first output port 208a and a second output port 208b, respectively, of the channel separator 202. The dispersion compensator 200 is further comprised of a first 210a and a second 210b light returning device, disposed so as to return output light from the first VIPA 204a back to the VIPA 204a and from the second VIPA 204b back to the VIPA 204b, respectively. The first VIPA 204a and the first light-returning device 210a together comprise a first partial-channel-set dispersion compensation device 214a. Likewise, the second VIPA 204b and the second light-returning device 210b together comprise a second partial-channel-set dispersion compensation device 214b. The optical couplings 206a–206b of dispersion compensator 200 include lenses so as to cause light to be input into the first 204a and second 204b VIPA. These optical couplings 206a–206b may also comprise optical fibers or any other combinations of light directing components, such as prisms or mirrors. The channel separator 202 receives, through its input port 212, wavelength-division multiplexed light, the channels of which contain varying degrees of undesired chromatic dispersion. The n channels of the input light are represented by the set of symbols $\lambda_1, \lambda_2, \ldots, \lambda_n$, or, more compactly, by $\lambda_1-\lambda_n$, where $\lambda_i$ denotes the central wavelength of the band of wavelengths comprising the $i^{th}$ such channel. The channel separator 202 separates the light, $\lambda_1-\lambda_n$, into both a first subset of channels, $\lambda_1, \lambda_3, \lambda_5, \ldots$ and a second subset of channels, $\lambda_2, \lambda_4, \lambda_6, \ldots$ where the first and the second such subsets are interleaved with one another. The first and second channel subsets are output from the first output port 208a to optical coupling 206a and from the second output port 208b to the optical coupling 206b, respectively. These first and second channel subsets are subsequently directed by the optical couplings 206a–206b to the first 214a and the second 214b partial-channel-set dispersion compensation devices, respectively.

The first 204a and second 204b VIPA each spatially disperses the wavelengths of light comprising each channel band according to their wavelengths and outputs a portion of the wavelengths to the first 210a and second 210b light returning devices, respectively. In the preferred embodiment, these light returning devices 210a–210b comprise mirrors or reflective surfaces. The first 210a and second 210b light returning devices therefore immediately returns the light received by itself to the first 204a and second 204b VIPA, respectively. The light returned to each VIPA 204a–204b then follows a nearly return or reverse path through the VIPA so as to be output to the coupling 206a or the coupling 206b.

Because of the characteristics of the wavelength dispersion of each VIPA 204a–204b and of the light return configuration of each light returning device 210a–210b, light comprising relatively longer wavelengths within each channel travels along a different physical path length to that of light of relatively shorter wavelengths of the channel. The differences in path lengths are such as to introduce chromatic dispersion into the light of each channel so as to compensate for and effectively negate the accumulated chromatic dispersion within each signal as originally input to dispersion compensator 200. Furthermore, the dispersion introduced to the light of each channel is variable among the channels so as to compensate for non-variable accumulated dispersion, or dispersion slope, among the input signals.

The returned channels $\lambda_1, \lambda_3, \lambda_5, \ldots$ of the first subset, with compensated chromatic dispersion, are returned to channel separator 202 through its first output port 208a via the first optical coupling 206a. Likewise, the returned channels $\lambda_2, \lambda_4, \lambda_6, \ldots$ of the second subset, also with compensated chromatic dispersion, are returned to channel separator 202 through its second output port 208b via the second optical coupling 206b. Because light propagation paths within channel separator 202 are entirely reversible, the channel separator 202 behaves as a wavelength multiplexer for light propagating through in the reverse direction. Therefore, returning first and second subsets of channels are recombined by channel separator 202 and output back to the fiber communications system from the channel separator 202 through its input port 212.

FIG. 2 also illustrates a use for the chromatic dispersion compensator within a fiber communications network in accordance with the present invention. In the network, the dispersion compensator 200 is optically coupled to a three-port optical circulator 216. Specifically, the optical circulator 216 comprises a first port 218a, a second port 218b and a third port 218c disposed about the circulator in this sequence, where the second port 218b is optically coupled to the input port 212 of channel separator 202. The first port 218a is optically coupled to and receives signal input from a first optical communications line 220, whereas the third port 218c is optically coupled to and delivers signal output to a second optical communications line 222. The wavelength division multiplexed signals input from the first optical communications line 220 contains undesired chromatic dispersion, where the degree of this chromatic dispersion varies among the plurality of channels comprising the input. These signals are directed from the first port 218a to the second port 218b of circulator 216 from which they are output from the circulator 216 and then input to the dispersion compensator 200. The dispersion compensator 200 compensates for the chromatic dispersion of all the multiplexed channels, and then returns the compensated signal lights back to the second port 218b of circulator 216. By the operation of circulator 216, which is well-known in the art, the signals with compensated chromatic dispersion are directed from the second port 218b to the third port 218c and thence to the second optical communications line 222. In this fashion, chromatic dispersion and chromatic dispersion slope within the wavelength-division-multiplexed signals of an optical communications system are compensated and returned to the system.

To more particularly describe the features of the chromatic dispersion compensator 200 in accordance with the present invention, please refer to FIGS. 3–14 in conjunction with the discussion below.

Figure 3:
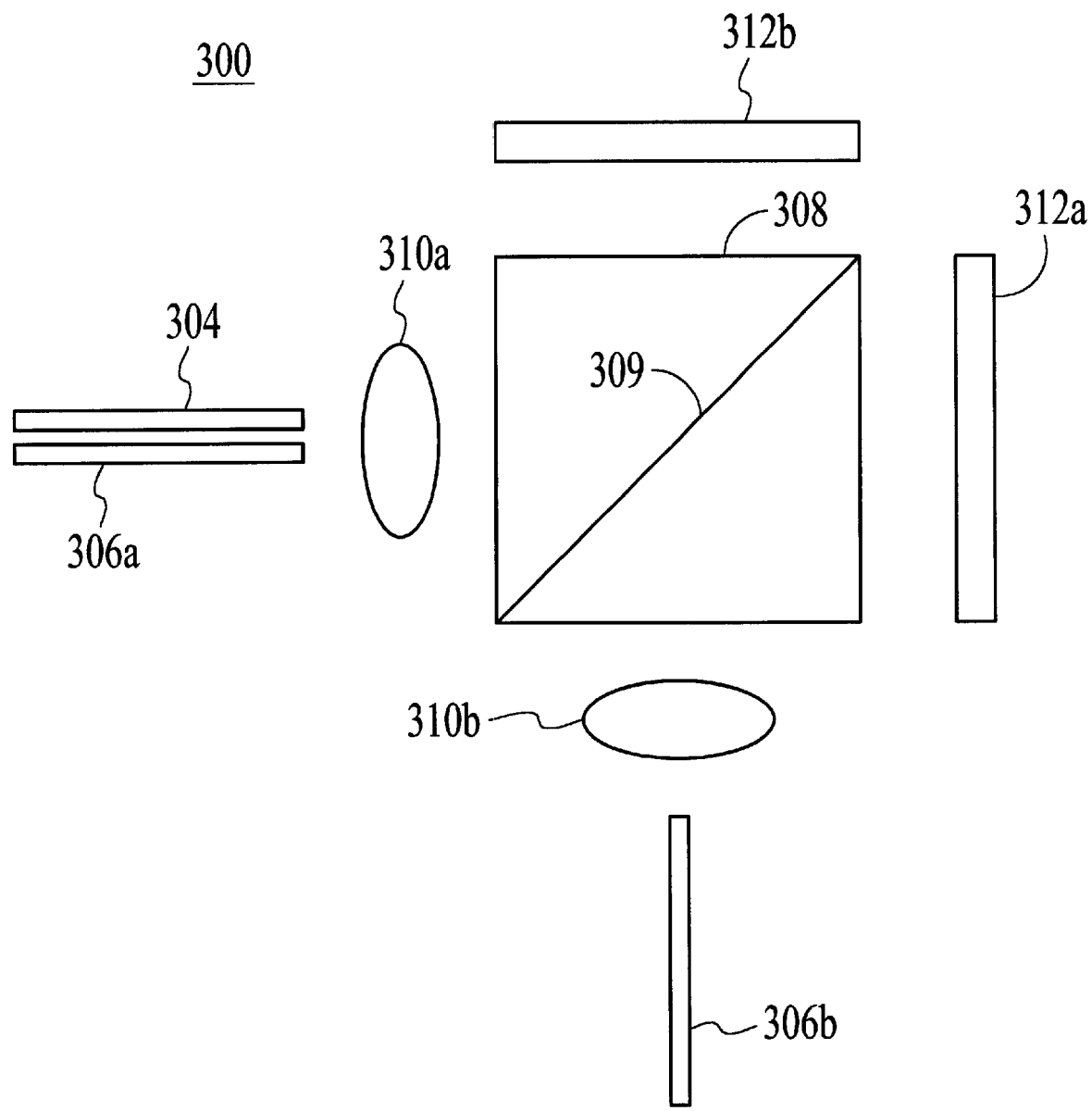
FIG. 3 rates a first preferred embodiment of a channel separator for the chromatic dispersion compensator in accordance with the present invention.

FIG. 3 illustrates a top view of a first preferred embodiment of a channel separator for the chromatic dispersion compensator in accordance with the present invention. The channel separator 300 illustrated in FIG. 3 is disclosed in the co-pending U.S. Patent Application entitled "Nonlinear Interferometer for Fiber Optic Wavelength Division Multiplexer Utilizing a Phase Differential Method of Wavelength Separation," Ser. No. 09/247,253, filed on Feb. 12, 1999. Applicant herein incorporates this patent application by reference.

The separator 300 comprises a polarization beam splitter 308, an input fiber 304, a first 306a and a second 306b output fiber, a first 310a and a second 310b lens or lens assembly, and a first 312a and a second 312b non-linear interferometer, where these components are disposed relative to one another as illustrated in FIG. 3. Although the polarization beam splitter 308 is shown as a "cube" beam splitter, any other form of beam splitter capable of separating light rays according to their polarization states may be utilized. The input fiber 304 and the first lens 310a together comprise the input port 212 of the channel separator 202, the first output fiber 306a and the first lens 310a together comprise the first output port 208a, and the second output fiber 306b and the second lens 310b together comprise the second output port 208b.

Each of the non-linear interferometers 312a–312b is also disclosed in the aforementioned U.S. patent application Ser. No. 09/247,253. Each of the non-linear interferometers 312a–312b has the property such that, if a light beam reflected therefrom is an optical signal comprising a plurality of channels evenly spaced in wavelength and the light of each channel is linearly polarized, then the light of every second channel is reflected with a 90° rotation of its polarization plane direction while the light of each remaining channel is reflected with unchanged polarization. The channels whose light rays experience the 90° polarization-plane rotation upon interaction with either one of the non-linear interferometers 312a–312b are arbitrarily referred to as "even channels" and the remaining channels are arbitrarily referred to as "odd channels".

The lens 310a collimates the signal light from input fiber 304 and directs it towards the polarization beam splitter 308 which decomposes the light of each signal based upon its polarity. This decomposition takes place at the body diagonal junction plane 309 of the beam splitter 308. The p-polarized component of the input signal passes through beam splitter 308 towards the first non-linear interferometer 312a. The s-polarized component of each signal is reflected towards the second non-linear interferometer 312b. Such p-polarized and s-polarized components are well known in the art and are not discussed further here. The interferometers 312a and 312b introduce phase differences between the even and odd channels of the signals.

Figure 4A:
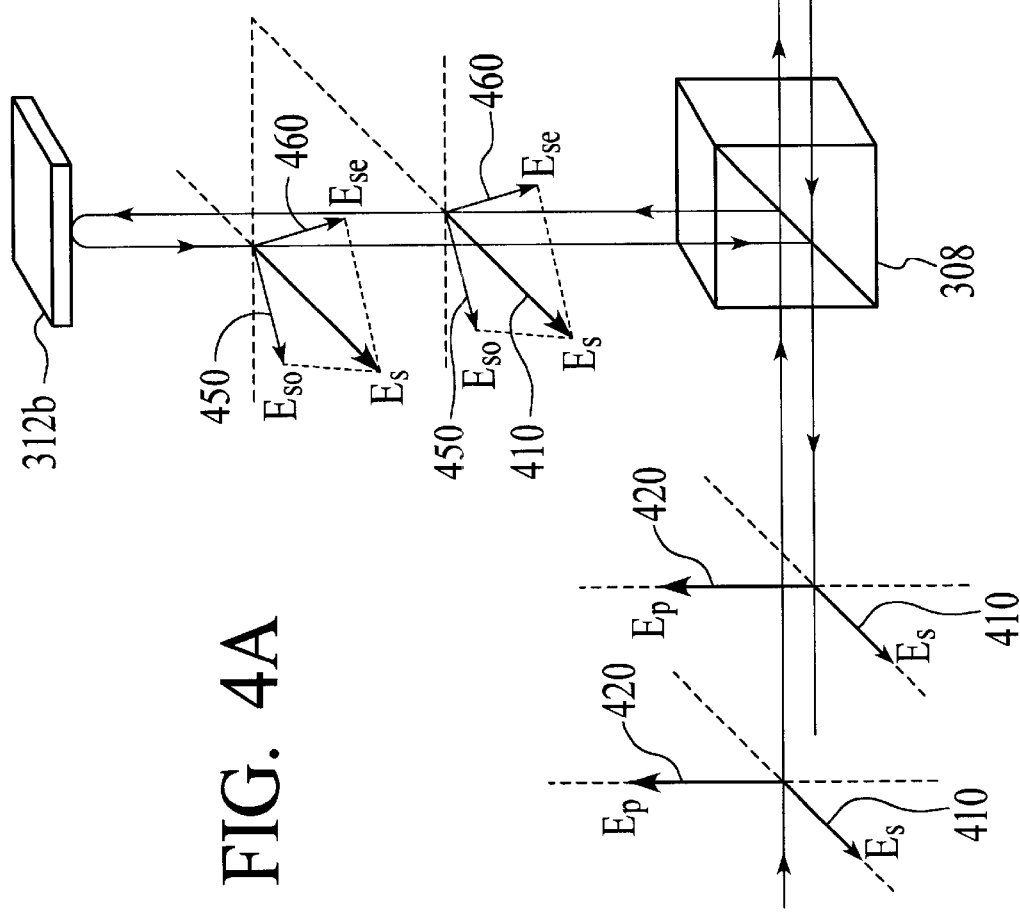
FIGS. 4a and 4b illustrate the paths and polarization states of odd and even channels, respectively, through the first preferred embodiment of the channel separator in accordance with the present invention.

FIG. 4a illustrates the path of the odd channels as they travel through the channel separator 300 with the interferometers 312a and 312b. The odd channels travel to the polarization beam splitter 308 from the input fiber 304. Each channel has an s polarity component ($E_s$) 410 and a p polarity component ($E_p$) 420. The $E_s$ and $E_p$ signals may each be decomposed into $E_o$ and $E_e$ components parallel to the principal ray directions of the birefringent elements in interferometer 312a and 312b, respectively. These components are well known in the art and will not be further described here. The vector $E_p$ 420 is decomposed into components $E_{po}$ 430 and $E_{pe}$ 440 whereas the vector $E_s$ 410 is decomposed into components $E_{so}$ 450 and $E_{se}$ 460. This decomposition is illustrated in FIG. 4a for each of the signal polarization component vectors $E_s$ and $E_p$ both before its entry into and after its exit from the interferometer 312b and 312a, respectively. The signal $E_p$ 420 travels to the interferometer 312a while $E_s$ 410 travels to interferometer 312b. Both sets of signals are reflected by the interferometers 312a–312b without a phase shift difference between $E_{so}$ 450 and $E_{se}$ 460 (or between $E_{po}$ 430 and $E_{pe}$ 440). Thus, both the signal $E_p$ 420 and the signal $E_s$ 410 travel back to the polarization beam splitter 308 without a change in orientation. These signals then travel back through the polarization beam splitter 308 to the first output fiber 306a.

Figure 4B:
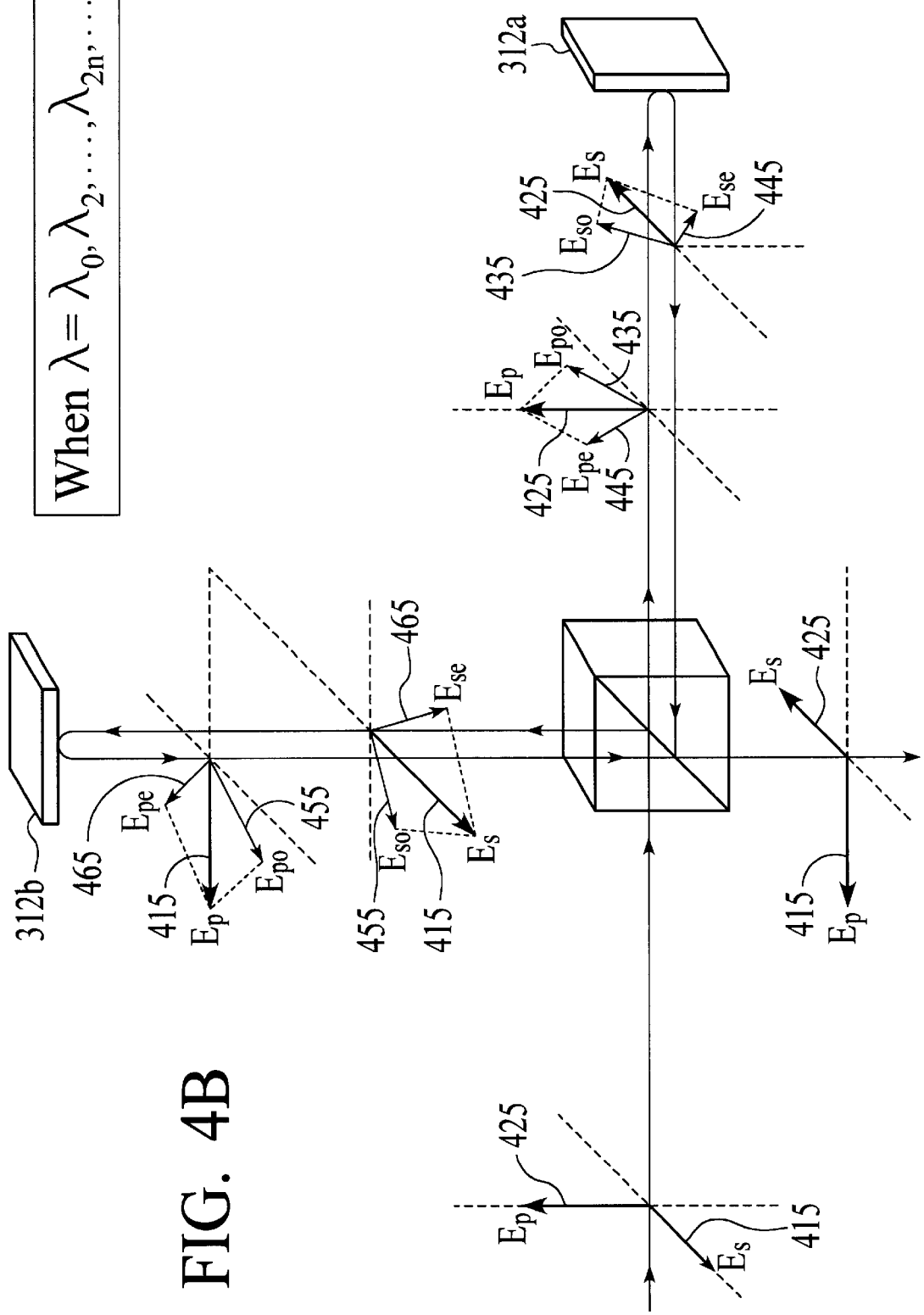

FIG. 4b illustrates the path of the even channels as they travel through the separator 300 with the interferometers 312a and 312b. As with the odd channels, the even channels travel to the polarization beam splitter 308 from the input fiber 304. Each channel has an s polarity component ($E_s$) 415 and a p polarity component ($E_p$) 425. As with the odd channels, the $E_s$ and $E_p$ signals may each be decomposed into $E_o$ and $E_e$ components parallel to the principal ray directions of the birefringent elements in interferometer 312b and 312a, respectively. The vector $E_p$ 425 is decomposed into components $E_{po}$ 435 and $E_{pe}$ 445 whereas the vector $E_s$ 415 is decomposed into components $E_{so}$ 455 and $E_{se}$ 465. This decomposition is illustrated in FIG. 4b for each of the signal vectors $E_s$ and $E_p$ both before its entry into and after its exit from the interferometer 312b and 312a, respectively. The signal $E_p$ 425 travels to the interferometer 312a while the signal $E_s$ 415 travels to interferometer 312b. For the even channels, interferometers 312a and 312b introduce a $\pi$ phase difference between $E_{po}$ 435 and $E_{pe}$ 445 and also between $E_{so}$ 455 and $E_{se}$ 465 respectively. This phase difference causes an effective $\pi/2$ rotation of each of the signals 415 and 425 thereby converting them from $E_s$ into $E_p$ and from $E_p$ into $E_s$, respectively. When both of these signals travel through beam splitter 308 again, this rotation causes them to travel to the second output fiber 306b. Thus, in this manner, the first output fiber 306a contains the odd channels while the second output fiber 306b contains the even channels.

Figure 5A:
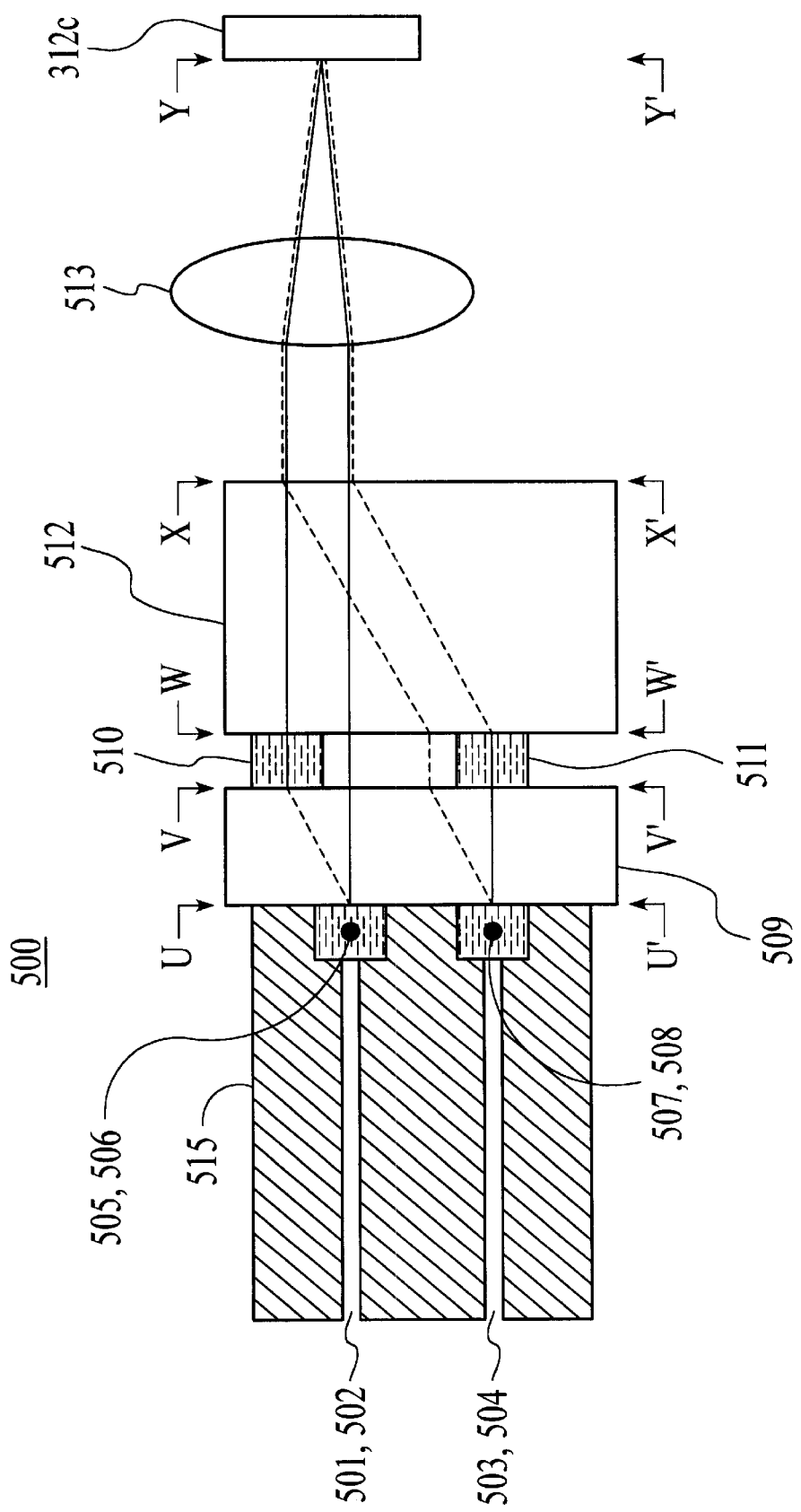
FIGS. 5a and 5b are side and end views of a second preferred embodiment of a channel separator in accordance with the present invention.

FIG. 5a shows a side view of a second preferred embodiment of a channel separator in accordance with the present invention. The channel separator 500 illustrated is disclosed in a co-pending U.S. Patent Application entitled "High-Isolation Dense Wavelength Division Multiplexer Utilizing Birefringent Plates and a Non-Linear Interferometer," Serial No. 09/404,005, filed on Sep. 23, 1999. Applicant herein incorporates this patent application by reference.

Figure 5B:
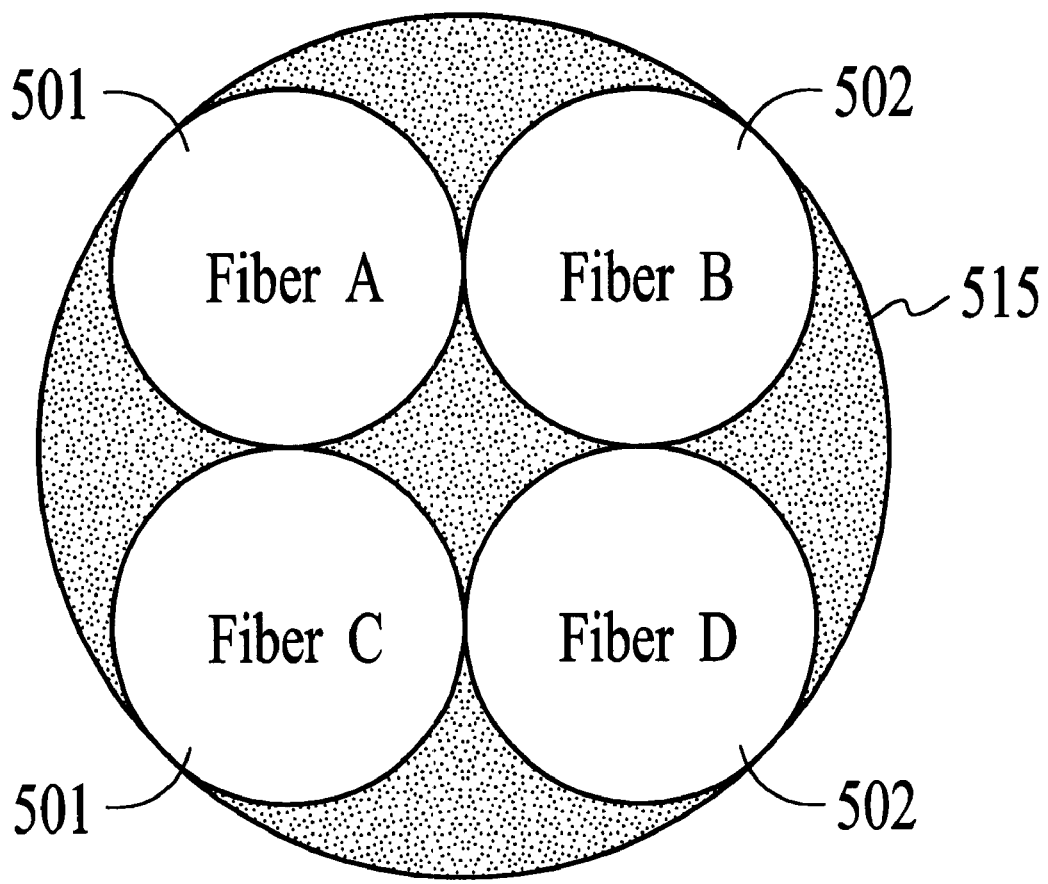

In the channel separator 500, reference numeral 515 is a four fiber ferrule and reference numerals 501, 502, 503 and 504 are four optical fibers, Fiber A, Fiber B, Fiber C and Fiber D, respectively, contained within and secured by ferrule 515. FIG. 5b shows an end view of the fiber configuration as viewed from the left side of the channel separator 500, as illustrated in FIG. 5a.

Returning to FIG. 5a, four collimator lenses 505–508 are incorporated into the end of ferrule 515 such that each collimator receives light from and directs light to exactly one of the fibers, specifically Fiber A 501, B 502, C 503 and D 504, respectively. Either Fiber A 501 together with the lens 505, or else Fiber C 503 together with the lens 507, comprises the input port 212 (FIG. 2). In the first such case, the Fiber B 502 and the lens 506 together comprise the first output port 208a, and the Fiber D 504 and the lens 508 together comprise the second output port 208b. In the second possible case, the Fiber D 504 and the lens 508 together comprise the first output port 208a, and the Fiber B 502 and the lens 506 together comprise the second output port 208b. Also, since the channel separator 500 is reversible, either Fiber B 502 or Fiber D 504 can be utilized as the input port, in which cases Fiber A 501 and Fiber C 503 are the output ports.

Disposed adjacent to the end of ferrule 515 is a first birefringent walk-off plate 509 which has the property of separating any signal light ray emanating from any of the fibers 501–504 into two physically separated linearly polarized sub-signal rays—one innermost and one outermost sub-signal ray. Because four fibers are contained within ferrule 515, eight separate sub-signals are so defined and are comprised of four outermost and four innermost sub-signals. The outermost and innermost sub-signals from both Fiber A 501 and Fiber B 502 comprise e-rays and o-rays, respectively, in their traverse through birefringent plate 509. Conversely, the outermost and innermost sub-signals from both Fiber C 503 and Fiber D 504 comprise o-rays and e-rays, respectively, in their traverse through birefringent plate 509.

In this specification, the polarization plane directions of e-rays and o-rays are referred to as "vertical" and "horizontal," respectively. Such orientation disposition references, are arbitrary and are made for the clarity of the discussion and the convenience of the reader, and by no means imply restriction of the use of the current invention to particular absolute spatial orientations of elements contained therein or of polarization planes of light rays propagating therethrough.

Disposed adjacent to the first birefringent plate 509 and on the side of plate 509 opposite to ferrule 515 are both a first half-wave plate 510 and a second half-wave plate 511. The first half-wave plate 510 is aligned so as to intercept only the two outermost sub-signals arising from Fiber A 501 and Fiber B 502. Likewise, half-wave plate 511 is aligned so as to intercept only the two outermost sub-signals arising from Fiber C 503 and Fiber D 504. A second birefringent walk-off plate 512 is disposed adjacent to the two half-wave plates 510 and 511 on the side opposite to the first birefringent plate 509. The thickness of birefringent plate 512 is designed so as to give an offset of e-rays propagating therethrough equivalent to the center-to-center distance between any pair of fibers. A lens or lens assembly 513 is disposed to the side of the second birefringent walk-off plate 512 opposite to the half wave plates 510 and 511. Finally, a non-linear interferometer 312c, of the same type as the non-linear interferometer 312a and 312b, illustrated in FIG. 3, is disposed at the focal point of lens 513 opposite to the birefringent plate 512.

Figure 6:
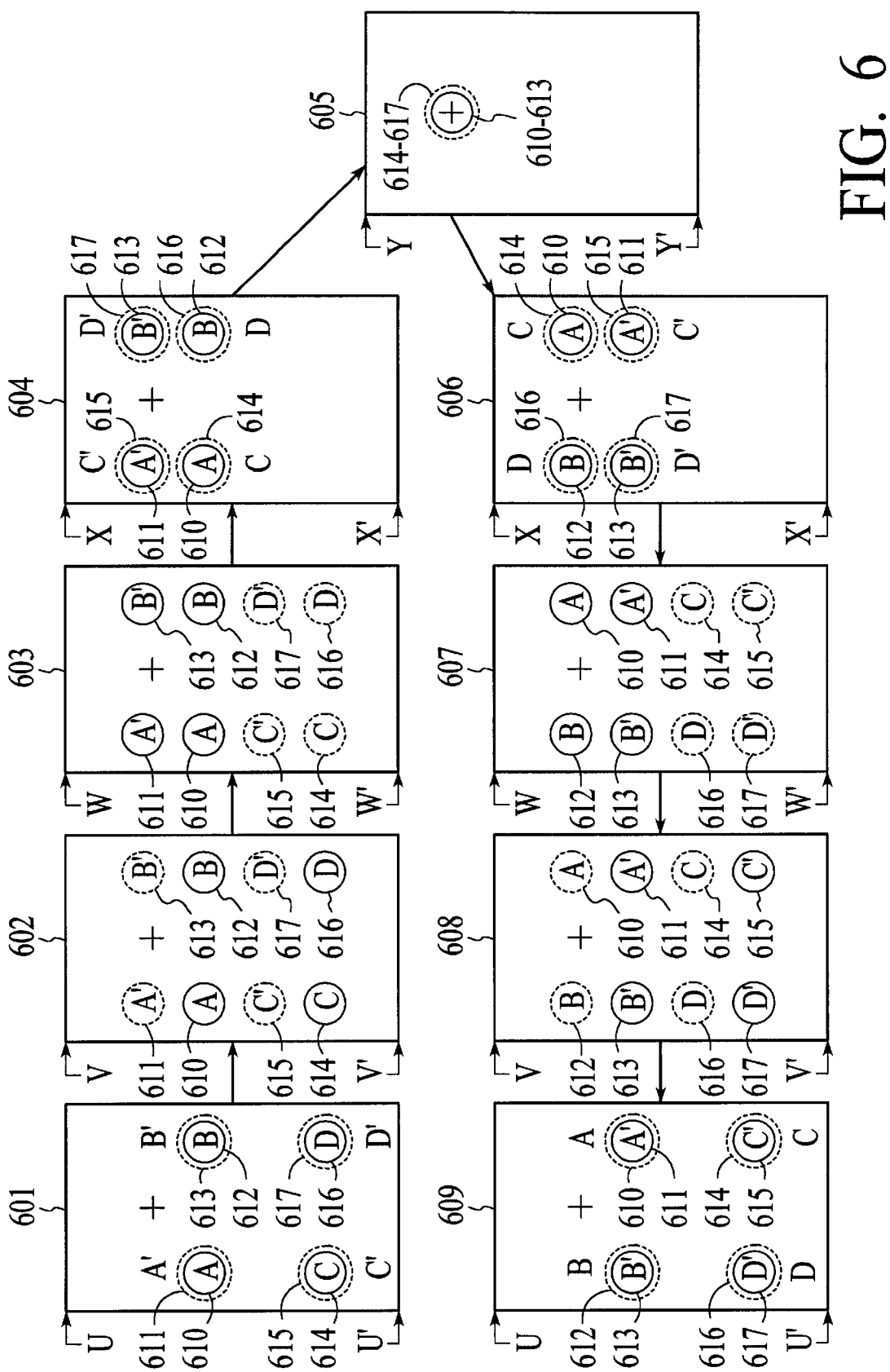
FIGS. 6 and 7 illustrate sequences of cross sectional views of fiber images for the odd and even channels, respectively, through the second preferred embodiment of the channel separator in accordance with the present invention.
Figure 7:
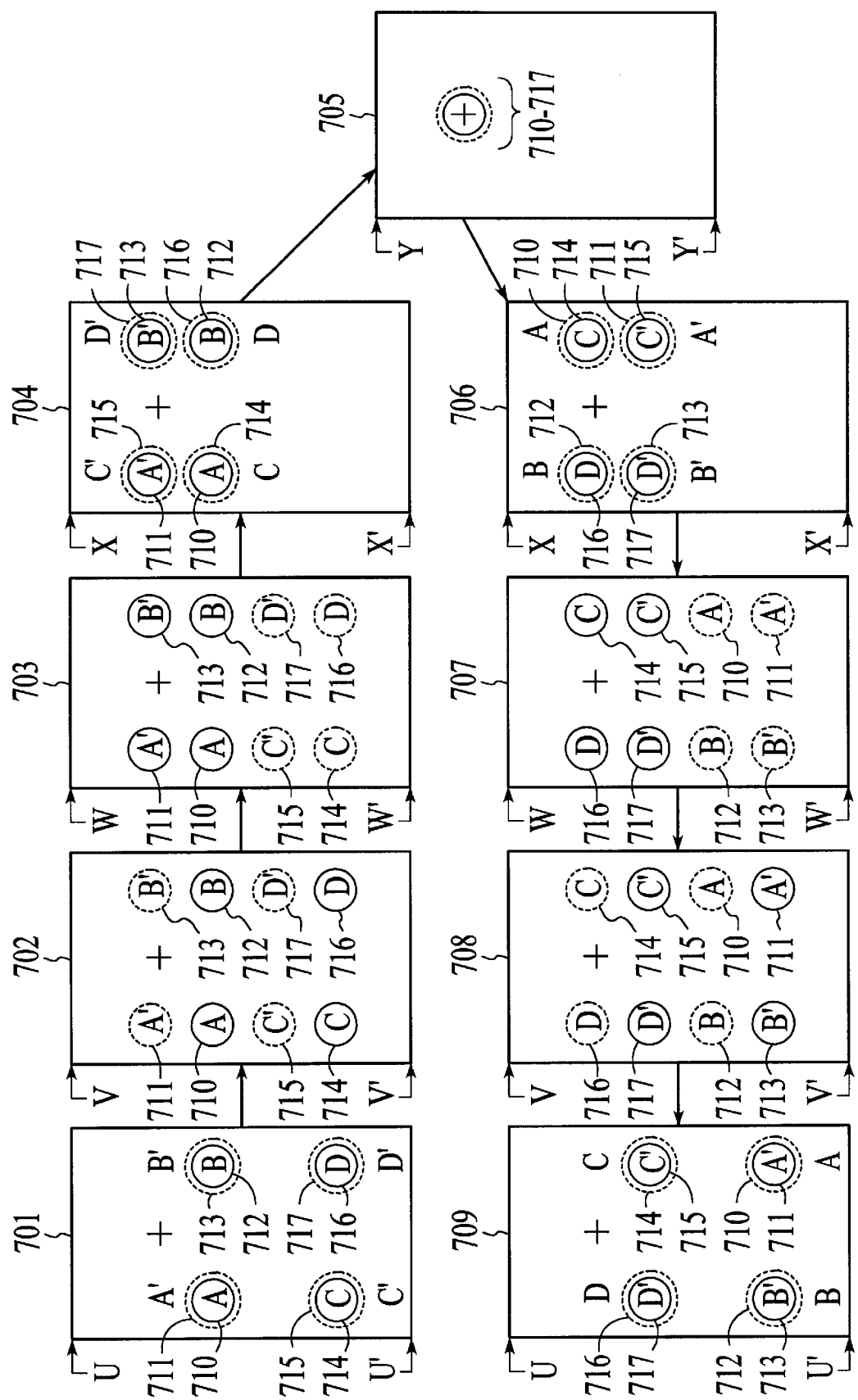

FIGS. 6 and 7 illustrate sequences of cross sectional views of fiber images for the odd and even channels, respectively, through the second preferred embodiment of the channel separator 500 in accordance with the present invention. These cross-sections are all drawn as viewed from the left side of the channel separator 500 of FIG. 5a and are taken at the labeled cross-sectional planes U–U', V–V', W–W', X–X', and Y–Y'. These cross-sections correspond to locations similarly labeled on FIG. 5a. The projection of the center of lens 513 onto each of these cross sections along a line parallel to the plane of the paper is designated by a plus ("+") sign. In FIG. 6 and FIG. 7, circles drawn with solid lines are used to denote sub-signals comprised of horizontally polarized light, circles drawn with dotted lines are used to denote sub-signals comprised of vertically polarized light and adjacent solid and dotted circles are used to denote overlapping sub-signals of differing polarization or else signals of mixed, random, or non-polarization. The sizes of these circles have no physical significance. All sub-signal light is reflected in the non-linear interferometer 312c of channel separator 500 so as to make one complete forward and one complete return traverse through channel separator 500. Therefore, each cross-section of sub-signal fiber images is shown twice, and heavy arrows indicate the relative sequence of images defined by light propagating through channel separator 500.

The paths of signals and sub-signals of odd channels are now described with reference to FIG. 6. As seen in cross section U–U' 601, signals emanating from each of the four fibers 501–504 are comprised of unpolarized light. After emanating from one of the four fibers 501–504 and passing through one of the collimator lenses 505–508, each light signal enters and passes through the first birefringent plate 509 which divides it into physically separated sub-signal components whose light rays are polarized horizontally and vertically, respectively. Sub-signal A 610, sub-signal B 612, sub-signal C 614 and sub-signal D 616 represent the horizontally polarized sub-signal light emanating, respectively, from Fiber A 501, Fiber B 502, Fiber C 503 and Fiber D 504. Likewise, sub-signal A' 611, sub-signal B' 613, sub-signal C' 615 and sub-signal D' 617 represent the vertically polarized sub-signal light emanating, respectively, from Fiber A 501, Fiber B 502, Fiber C 503 and Fiber D 504.

The four vertically polarized sub-signals A' 611, B' 613, C' 615 and D' 617 all comprise e-rays during their traverse through the first birefringent plate 509. Therefore, as shown in cross-section V–V' 602, sub-signals 611, 613, 615 and 617 are all shifted or offset in a first direction perpendicular to the fiber axes with respect to the matching horizontally polarized sub-signals, A 610, B 612, C 614 and D 616, respectively. After passing the first birefringent plate 509, the four outermost sub-signals A' 611, B' 613, C 614 and D 616 pass through one of the two 90° half-wave plates, 510 and 511, and therefore each sub-signal incurs a 90° rotation of the polarization plane direction of its light rays. Thus, as shown in cross section W–W' 603, the polarization plane directions of light rays of sub-signals A' 611 and B' 613 change from vertical to horizontal while those of light rays of sub-signals C 614 and D 616 change from horizontal to vertical.

After passing the positions of the half-wave plates 510 and 511, all sub-signals enter and pass through the second birefringent walk-off plate 512. The four sub-signals comprised of vertically polarized light, C' 615, D' 617, C 614 and D 616, traverse birefringent plate 412 as e-rays and are thus deflected. Simultaneously, the four sub-signals comprised of horizontally polarized light, A' 611, B' 613, A 610 and B 612, traverse birefringent plate 512 as undeflected o-rays. The thickness of bireftingent plate 512 is chosen such that the lateral deflection of e-rays upon traversing therethrough is in the first direction and is substantially equal to the center-to-center inter-fiber distance. For this reason, after passing through birefringent plate 512, the two sub-signal images C' 615 and C 614 become superimposed on the sub-signal images A' 611 and A 610, respectively and the two sub-signal images D' 617 and D 616 become superimposed on the sub-signal images B' 613 and B 612, respectively. This superimposition of sub-signals is shown in cross section X–X' 604.

After exiting plate 512, each pair of superimposed sub-signals, A' 611 and C' 615, A 610 and C 614, B' 613 and D' 617, and B 612 and D 616 travels along its own path with the two sub-signals comprising each pair remaining superimposed, one upon the other. These four pairs of sub-signals travel to and through the lens 513, which brings them all to a common focal point within the non-linear interferometer 312c as shown in cross-section Y–Y' 605. The non-linear interferometer 312c reflects these odd-channel sub-signals back along their return paths through separator 312c without a change in polarization. Thus, the four pairs of sub-signals immediately diverge from one another after being reflected by the non-linear interferometer 312c and pass through lens 513 a second time in the reverse direction. The diverging pathways of the four pairs of returning sub-signals are set parallel to one another by lens 513. Thus, these four pairs of sub-signals are directed back towards the second birefringent plate 512 along pathways which, between the birefringent plate 512 and the lens 513, exactly superimpose upon those of forward propagating pairs of sub-signals.

Cross section x–x' 606 shows the locations of the pairs of superimposed sub-signal images at their points of return entry into birefringent plate 512. The focusing and re-collimation of sub-signal images by lens 513 causes the inversion of image positions about the center of the lens 513 as projected onto cross-section x–x' 606. This inversion causes interchange of the positions of the various pairs of sub-signals as projected onto cross-section x–x' 606, with respect to cross section X–X' 604. Thus, upon re-entry into plate 512, as shown in cross-section x–x' 606, the location of the returning pair of sub-signal images B 612 and D 616 is the same as that of the forward propagating pair of sub-signals A' 611 and C' 615. Likewise, in cross-section x–x' 606 of FIG. 6, the locations of returning pairs of sub-signals A 610 and C 614, B' 613 and D' 617, and A' 611 and C' 615 are identical to those of forward propagating pairs of sub-signals B' 613 and D' 617, A 610 and C 614, and B 612 and D 616, respectively.

During return passage through the second birefringent plate 512, the sub-signals comprised of vertically polarized light, D 616, C 614, D' 617 and C' 615, pass therethrough as deflected e-rays while those comprised of horizontally polarized light, B 612, A 610, B' 613 and A' 611, pass therethrough as undeflected o-rays. For this reason, the two sub-signals comprising each pair of superimposed sub-signals become re-separated one from another upon passing through birefringent plate 512 a second time. The deflection of sub-signals D 616, C 614, D' 617 and C' 615 upon their second traverse through birefringent plate 512 is exactly equal and opposite to their deflection during their first traverse through this plate 512. Therefore, the locations of the images of the various sub-signals after the second traverse of these sub-signals through birefringent plate 512 are as shown in cross section w–w' 607.

After exiting the second birefringent plate 512, the outermost returning sub-signals B 612, A 610, D' 617 and C' 615 pass through one of the two 90° half-wave plates, 510 and 511, and therefore each incurs a 90° rotation of the polarization plane direction of its light rays. After passing, in the return direction, the positions of the 90° half-wave plates, 510 and 511, the positions and polarization states of the various sub-signals are as shown in cross section v–v' 608.

Finally, all sub-signals enter the first birefringent walk-off plate 509 in the return direction. The sub-signals comprised of vertically polarized light, B 612, A 610, D 616 and C 614, pass through plate 509 as deflected e-rays while those comprised of horizontally polarized light, B' 613, A' 611, D' 617 and C' 615, pass through plate 509 as undeflected o-rays. The deflection of sub-signals B 612, A 610, D 616 and C 614 during return passage through plate 509 is exactly equal and opposite to the deflection of sub-signals B' 613, A' 611, D' 617 and C' 615 during their forward passage through this plate 509. Therefore, each pair of sub-signals A 610 and A' 611, B 612 and B' 613, C 614 and C' 615, and D 616 and D' 617 becomes recombined at the positions of the fiber collimator lenses 505–508. Each of the collimator lenses focuses the return-path signal impinging thereon into the immediately adjacent fiber. As shown in cross section u–u' 609, therefore, the recombined signals are located such that the signals originally from Fiber A, from Fiber B, from Fiber C and from Fiber D are directed into Fiber B, Fiber A, Fiber D and Fiber C, respectively.

The paths of signals and sub-signals of the even channels through the separator 500 are now described with reference to FIG. 7. After emanating from one of the four fibers 501–504 and passing through one of the collimator lenses 505–508, signal light enters and passes through the first birefringent plate 509 which separates it into physically separated horizontally and vertically polarized sub-signal components. Sub-signal A 710, sub-signal B 712, sub-signal C 714 and sub-signal D 716 represent the horizontally polarized sub-signal light emanating, respectively, from Fiber A 501, Fiber B 502, Fiber C 503 and Fiber D 504. Likewise, sub-signal A' 711, sub-signal B' 713, sub-signal C' 715 and sub-signal D' 717 represent the vertically polarized sub-signal light emanating, respectively, from Fiber A 501, Fiber B 502, Fiber C 503 and Fiber D 504.

The forward propagating pathways of even channel sub-signals through separator 500 are identical to those of odd channel sub-signals up until they encounter the non-linear interferometer 312c, as discussed above. Upon reflection from non-linear interferometer 312c, however, the directions of the polarization planes of light of even channel sub-signals are all rotated by 90°. As a consequence, after reflection from non-linear interferometer 312c and embarkation upon their return pathways, the light rays comprising sub-signals A 710, B 712, A' 711, and B' 713, become vertically polarized while the light rays comprising sub-signals C 714, D 716 C' 715 and D' 717 become horizontally polarized.

Cross section x–x' 706 shows the locations and polarization states of even-channel sub-signal images upon their re-entry into second birefringent walk-off plate 512. During return passage through the second birefringent plate 512, the sub-signals comprised of vertically polarized light, B 712, A 710, B' 713 and A' 711, pass therethrough as deflected e-rays while those comprised of horizontally polarized light D 716, C 714, D' 717 and C' 715 pass through as undeflected o-rays. For this reason, the two sub-signals comprising each pair of superimposed sub-signals become re-separated one from another upon passing through birefringent plate 512 a second time. The common deflection of sub-signals B 712, A 710, B' 713 and A' 711 upon their second traverse through birefringent plate 512 is exactly equal and opposite to the deflection of sub-signals C 714, D 716, C' 715 and D' 717 during their first traverse through this plate 512. Therefore, the locations of the various sub-signals after the second traverse of these sub-signals through birefringent plate 512 are as shown in cross section w–w' 707.

After exiting the second birefringent plate 512, the outermost returning sub-signals D 716, C 714, B' 713 and A' 711 pass through one of the two 90° half-wave plates, 510 and 511, and therefore each incurs a 90° rotation of the polarization plane direction of its light rays. After passing, in the return direction, the positions of the 90° half-wave plates, 510 and 511, the positions and polarization states of the various sub-signals are as shown in cross section v–v' 708.

Finally, all sub-signals enter the first birefringent walk-off plate 509 in the return direction. The vertically polarized sub-signals D 716, C 714, B 712 and A 710 pass through plate 509 as deflected e-rays while the horizontally polarized sub-signals D' 717, C' 715, B' 713 and A' 711 pass through plate 509 as undeflected o-rays. The common deflection of sub-signals D 716, C 714, B 712 and A 710 during their return passage through plate 509 is exactly equal and opposite to the deflection of sub-signals D' 717, C' 715, B' 713 and A' 711 during their forward passage through this plate 509. Therefore, each pair of sub-signals A 710 and A' 711, B 712 and B' 713, C 714 and C' 715, and D 716 and D' 717 becomes recombined at the positions of the fiber collimator lenses 505–508. Each of the collimator lenses 505–508 focuses the return-path signal impinging thereon into the immediately adjacent fiber. As shown in cross section u–u' 709, the recombined signals are located such that the signals originally from Fiber A, from Fiber B, from Fiber C and from Fiber D are directed into Fiber D, Fiber C, Fiber B and Fiber A, respectively.

Figure 8:
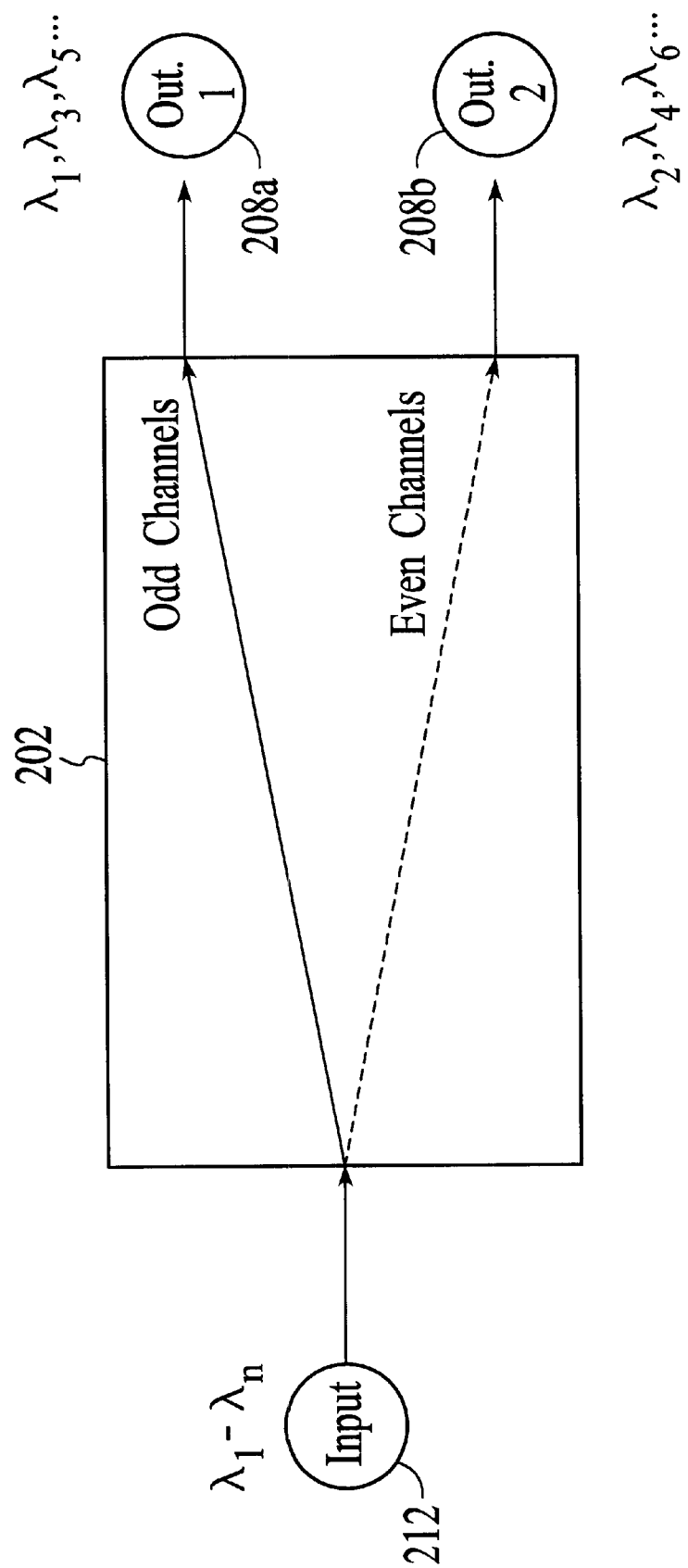
FIG. 8 is a functional signal routing diagram for the first and second preferred embodiments of the channel separator in accordance with the present invention.

FIG. 8 is one example of a functional signal routing diagram for the first and second preferred embodiment of the channel separator in accordance with the present invention. In the first preferred embodiment 300 (FIG. 3), the input fiber 304 and the first lens 310 together comprise the input port 212 of the channel separator 202, the first output fiber 306a and the first lens 310a together comprise the first output port 208a, and the second output fiber and the second lens 310b together comprise the second output port 208b. In the second preferred embodiment 500 (FIG. 5), either the Fiber A 501 together with the lens 505 or else the Fiber C 503 together with the lens 507 comprises the input port 212 of the channel separator 202. In the first such case, the Fiber B 502 and the lens 506 together comprise the first output port 208a, and the Fiber D 504 and the lens 508 together comprise the second output port 208b. In the second possible case, the Fiber D 504 and the lens 508 together comprise the first output port 208a, and the Fiber B 502 and the lens 506 together comprise the second output port 208b. As illustrated in FIG. 8, odd-channel signals input to the channel separator 202 through input port 212 are directed to the first output port 208a, where even channel signals input to the separator 202 from input 212 are directed to the second output port 208b. In this way, either the first preferred embodiment 300 or the second preferred embodiment 500 of the channel separator functions as a dense wavelength division de-multiplexer which discriminates amongst the pathways of odd and even channels. Since the light pathways through either separator 300 or separator 500 are entirely reversible, when light propagates in the reverse direction through either channel separator 300 or 500, then the channel separator 300, 500 functions as a wavelength division multiplexer which combines a set of odd together with a set of even channels.

Figure 9:
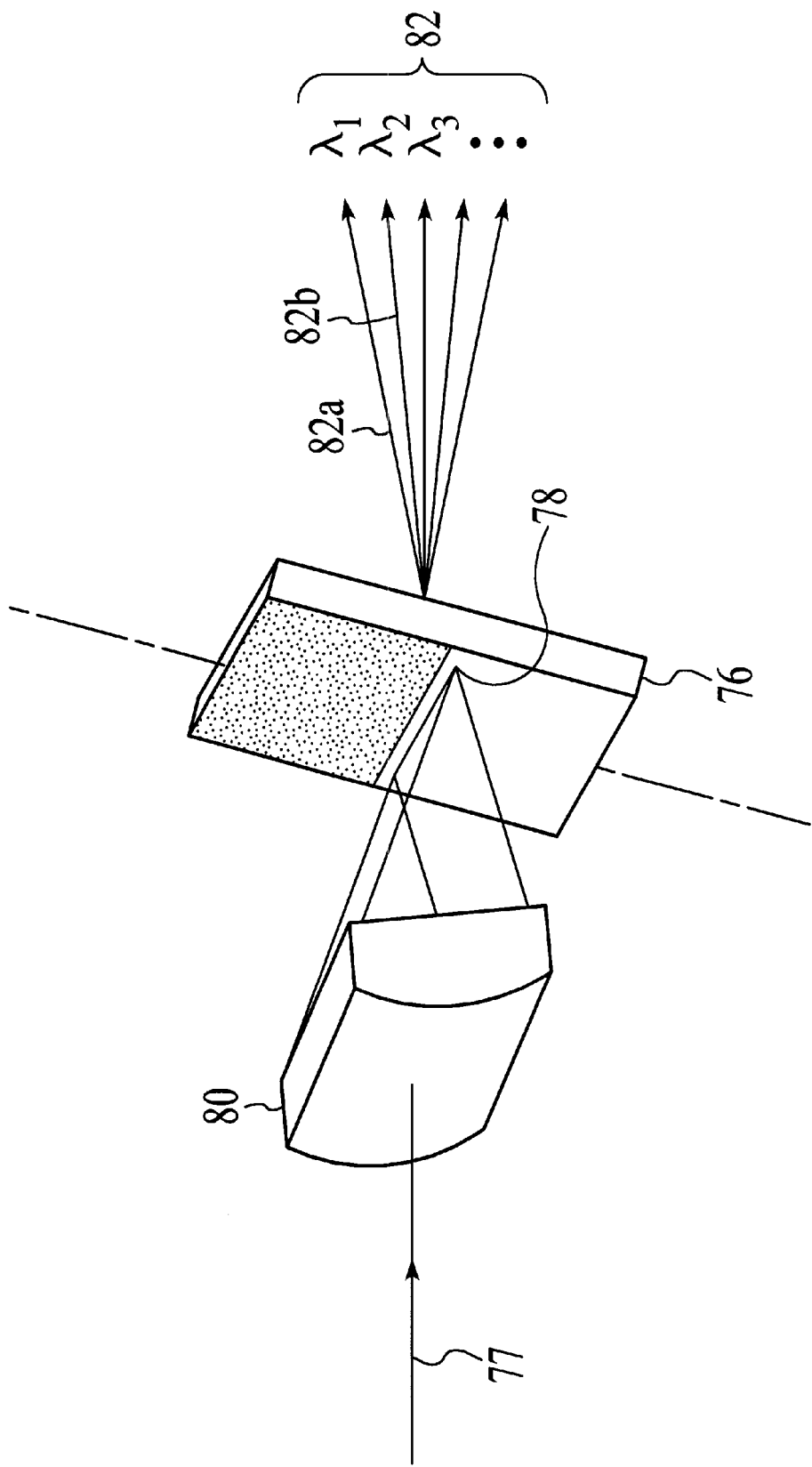
FIG. 9 is a diagram illustrating a Virtually Imaged Phased Array (VIPA) for a partial-channel-set dispersion compensation device in accordance with the present invention.

FIG. 9 is a diagram illustrating a VIPA for a partial-channel-set dispersion compensation device 214a–214b in accordance with the present invention. The VIPA is disclosed in U.S. Pat. No. 5,930,045, incorporated herein by reference. Other operational and configurational aspects of the VIPA apparatus are disclosed in the following co-pending U.S. Patent applications assigned to the current assignee: "Virtually Imaged Phased Array (VIPA) Having Spacer Element and Optical Length Adjusting Element," Ser. No. 09/140,638, filed on Aug. 26, 1998; "Virtually Imaged Phased Array (VIPA) Having a Varying Reflectivity Surface to Improve Beam Profile," Ser. No. 09/114,071, filed on Jul. 13, 1998; and "Virtually Imaged Phased Array (VIPA) Having Lenses Arranged to Provide a Wide Beam Path," Ser. No. 09/140,639, filed on Aug. 26, 1998. All of the above-mentioned co-pending U.S. Patent Applications are incorporated herein by reference.

Referring now to FIG. 9, a VIPA 76 is preferably made of a thin plate of glass. An input light 77 is focused into a line 78 with a lens 80, such as a semi-cylindrical lens, so that input light 77 travels into VIPA 76. Line 78 is hereinafter referred to as "focal line 78". Input light 77 radially propagates from focal line 78 to be received inside VIPA 76. The VIPA 76 then outputs a luminous flux 82 of collimated light, where the output angle of luminous flux 82 varies as the wavelength of input light 77 changes. For example, when input light 77 is at a wavelength $\lambda_1$, VIPA 76 outputs a luminous flux 82a at wavelength $\lambda_1$, in a specific direction. When input light 77 is at a wavelength $\lambda_2$ VIPA 76 outputs a luminous flux 82b at wavelength $\lambda_2$ in a different direction. Therefore, VIPA 76 produces luminous fluxes 82a and 82b that are spatially distinguishable from each other.

Figure 10:
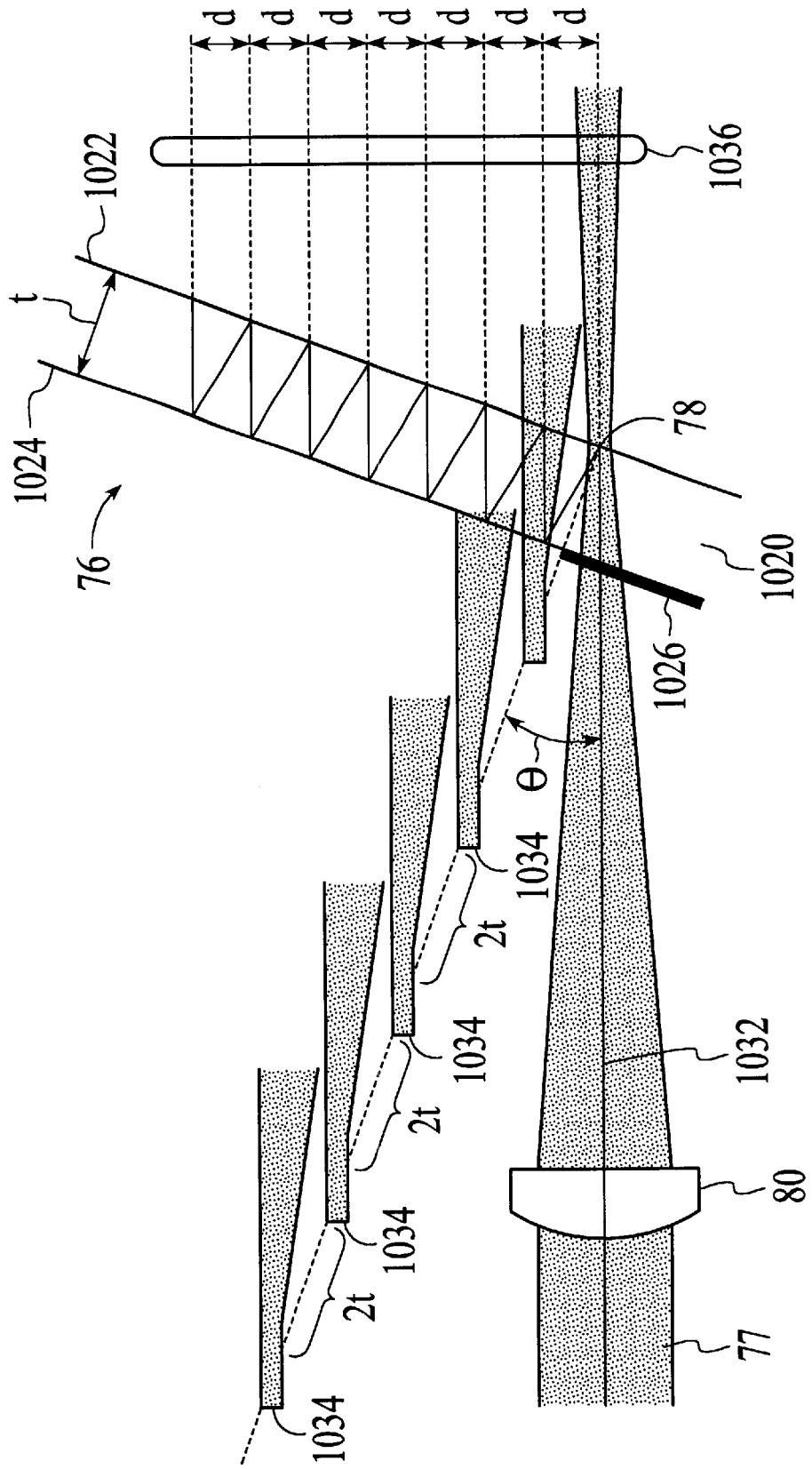
FIG. 10 is a detailed diagram illustrating the light path through and operation of the VIPA in accordance with the present invention.

FIG. 10 is a detailed diagram illustrating the light path through and operation of the VIPA 76 in accordance with the present invention. The VIPA 76 includes a plate 1020 made of, for example, glass, and having reflecting films 1022 and 1024 thereon. Reflecting film 1022 preferably has a reflectance of approximately 95% or higher, but less than 100%. Reflecting film 1024 preferably has a reflectance of approximately 100%. A radiation window 1026 is formed on plate 1020 and preferably has a reflectance of approximately 0% reflectance.

Input light 77 is focused into focal line 78 by lens 80 through radiation window 1026, to undergo multiple reflection between reflecting films 1022 and 1024. Focal line 78 is preferably on the surface of plate 1020 to which reflecting film 1022 is applied. Thus, focal line 78 is essentially line focused onto reflecting film 1022 through radiation window 1026. The width of focal line 78 can be referred to as the "beam waist" of input light 77 as focused by lens 80. Thus, the VIPA 76 focuses the beam waist of input light 77 onto the far surface (that is, the surface having reflecting film 1022 thereon) of plate 1020. By focusing the beam waist on the far surface of plate 1020, the VIPA 76 in accordance with the present invention reduces the possibility of overlap between (i) the area of radiation window 1026 on the surface of plate 1020 covered by input light 77 as it travels through radiation window 1026 and (ii) the area on reflecting film 1024 covered by input light 77 when input light 77 is reflected for the first time by reflecting film 1024. It is desirable to reduce such overlap to ensure proper operation of the VIPA 76.

In FIG. 10, an optical axis 1032 of input light 77 has a small tilt angle $\theta$ with respect to a line perpendicular to the plane of plate 1020. Upon the first reflection off of reflecting film 1022, 5% of the light passes through reflecting film 1022 and diverges after the beam waist, and 95% of the light is reflected towards reflecting film 1024. After being reflecting by reflecting film 1024 for the first time, the light again hits reflecting film 1022 but is displaced by an amount d. Then, 5% of the light passes through reflecting film 1022. In a similar manner, as illustrated in FIG. 10, the light is split into many paths with a constant separation d. The beam shape in each path forms so that the light diverges from virtual images 1034 of the beam waist. Virtual images 1034 are located with constant spacing 2t along a line that is normal to plate 1020, where t is the thickness of plate 1020. The positions of the beam waists in virtual images 1034 are self-aligned, and there is no need to adjust individual positions. The lights diverging from virtual images 1034 interfere with one other and form collimated light 1036 which propagates in a direction that changes in accordance with the wavelength of input light 77.

The spacing of light paths is d=2t Sin θ, and the difference in the path lengths between adjacent beams is 2t Cos θ. The angular dispersion of the VIPA 76 is proportional to the ratio of these two numbers, which is cot θ. As a result, a VIPA produces a significantly large angular dispersion.

The plate 1020 has reflecting surfaces 1022 and 1024 thereon. Reflecting surfaces 1022 and 1024 are in parallel with each other and spaced by the thickness t of plate 1020 and are typically reflecting films deposited on plate 1020. As previously described, reflecting surface 1024 has a reflectance of approximately 100%, except in radiation window 1026, and reflecting surface 1022 has a reflectance of approximately 95% or higher. Therefore, reflecting surface 1022 has a transmittance of approximately 5% or less so that approximately 5% or less of light incident on reflecting surface 1022 will be transmitted through and approximately 95% or more of the light will be reflected. The reflectances of reflecting surfaces 1022 and 1024 can easily be changed in accordance with the specific VIPA application. However, generally, reflecting surface 1022 should have a reflectance which is less than 100% so that a portion of incident light can be transmitted through.

The reflecting surface 1024 has a radiation window 1026. Radiation window 1026 allows light to pass therethrough, and preferably has no reflectance, or a very low reflectance. Radiation window 1026 receives input light 77 to allow input light 77 to be received between, and reflected between, reflecting surfaces 1022 and 1024.

A VIPA 76 has strengthening conditions which are characteristics of the design of the VIPA 76. The strengthening conditions increase the interference of the output lights so that a luminous flux is formed. The strengthening conditions of the VIPA 76 are represented by the following Equation (1):

$$2t \cos \Phi = m\lambda$$

in which $\Phi$ indicates the propagation direction of the resulting luminous flux as measured from a line perpendicular to the surface of reflecting surfaces 1022 and 1024, $\lambda$ indicates the wavelength of the input light, t indicates the distance between the reflecting surfaces 1022 and 1024, and m indicates an integer. Therefore, if t is constant and m is assigned a specific value, then the propagation direction $\Phi$ of the luminous flux formed for input light having wavelength X can be determined.

More specifically, input light 77 is radially dispersed from focal line 78 through a specific angle. Therefore, input light having the same wavelength will be travelling in many different directions from focal line 78, to be reflected between reflecting surfaces 1022 and 1024. The strengthening conditions of the VIPA 76 cause light travelling in a specific direction to be strengthened through interference of the output lights to form a luminous flux having a direction corresponding to the wavelength of the input light. Light travelling in different direction than the specific direction required by the strengthening condition is weakened by the interference of the output lights.

Figure 11:
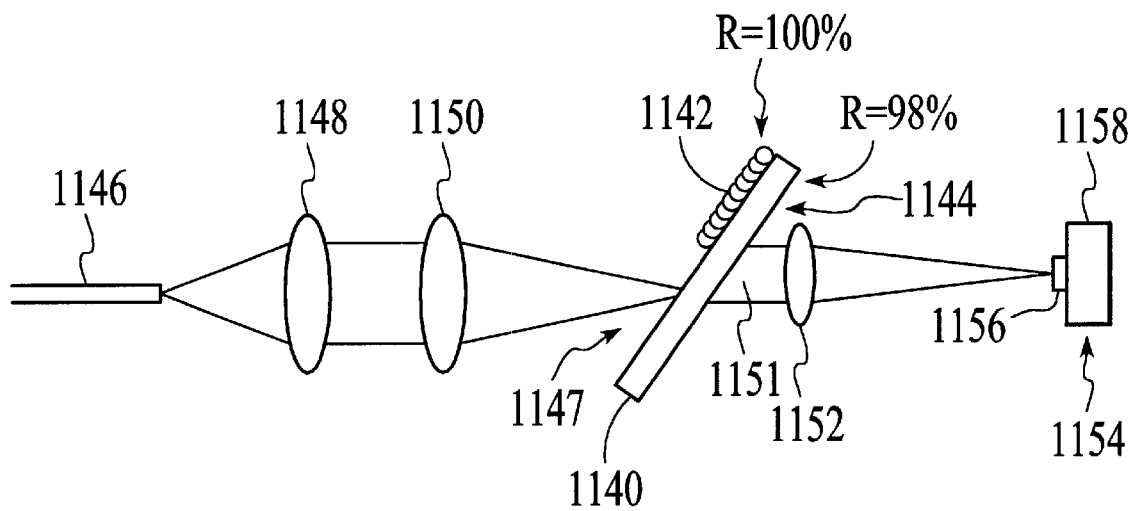
FIG. 11 is a diagram illustrating a first preferred embodiment of a partial-channel-set dispersion compensation device in accordance with the present invention.

FIG. 11 is a diagram illustrating a first preferred embodiment of a partial-channel-set dispersion compensation device in accordance with the present invention. A light is output from a fiber 1146, collimated by a collimating lens 1148 and line-focused into VIPA 1140 through radiation window 1147 by a cylindrical lens 1150. The VIPA 1140 then produces a collimated light 1151 which is focused by a focusing lens 1152 onto a mirror 1154. Mirror 1154 can be a mirror portion 1156 formed on a substrate 1158. Mirror 1154 reflects the light back through focusing lens 1152 into VIPA 1140. The light then undergoes multiple reflections in VIPA 1140 and is output from radiation window 1147. The light output from radiation window 1147 travels through cylindrical lens 1150 and collimating lens 1148 and is received by fiber 1146.

Therefore, light is output from VIPA 1140 and reflected by mirror 1154 back into VIPA 1140. The light reflected by mirror 1154 travels through the path which is exactly opposite in direction to the path through which it originally traveled. Different wavelength components in the light are focused onto different positions on mirror 1154, and are reflected back to VIPA 1140. As a result, different wavelength components travel different distances, to thereby produce chromatic dispersion.

Figure 12:
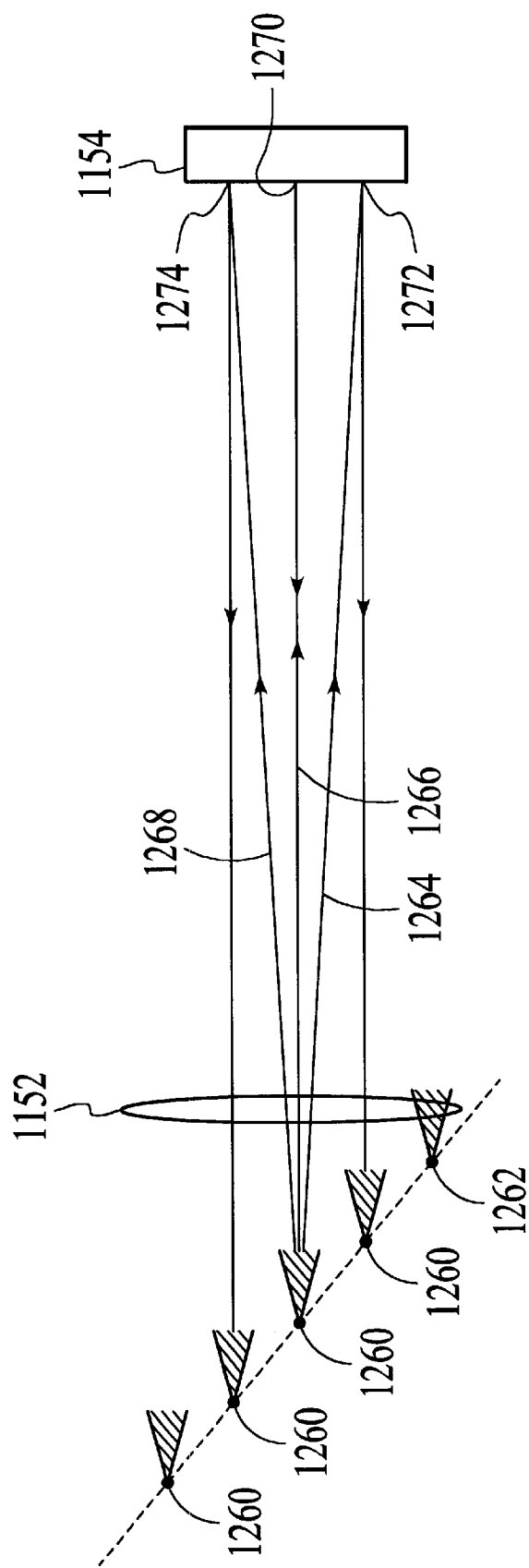
FIG. 12 is a more detailed diagram illustrating the operation of the first preferred embodiment of the partial-channel-set dispersion compensation device in accordance with the present invention.

FIG. 12 is a more detailed diagram illustrating the operation of the first preferred embodiment of the partial-channel-set dispersion compensation device in accordance with the present invention. Assume a light having various wavelength components is received by VIPA 1140. The VIPA 1140 will cause the formation of virtual images 1260 of beam waist 1262, where each virtual image 1260 emits light. Focusing lens 1152 focuses the different wavelength components in a collimated light from VIPA 1140 at different points on mirror 1154. More specifically, a longer wavelength 1264 focuses at point 1272, a center wavelength 1266 focuses at point 1270, and a shorter wavelength 1268 focuses at point 1274. Then, longer wavelength 1264 returns to a virtual image 1260 that is closer to beam waist 1262, as compared to center wavelength 1266. Shorter wavelength 1268 returns to a virtual image 1260 that is farther from beam waist 1262, as compared to center wavelength 1266. Thus, the arrangement provides for normal dispersion.

Mirror 1154 is designed to reflect only light in a specific interference order, and light in any other interference order should be focused out of mirror 1154. More specifically, as previously described, a VIPA will output a collimated light. This collimated light will travel in a direction in which the path from each virtual image has a difference of $m\lambda$, where m is an integer. The $m^{th}$ order of interference is defined as an output light corresponding to m. Each order comprises a plurality of wavelength components and the wavelength components of one order are repeated in any other order. However, collimated lights at the same wavelength for different interference orders generally travel in different directions and are therefore focused at different positions. Thus, the mirror 1154 can be made to reflect only light from a single interference order back into VIPA 1140.

A wavelength division multiplexed light usually includes many channels, where each channel has a center wavelength and the center wavelengths are usually spaced apart by a constant frequency spacing. If the thickness t between first and second surfaces 1142 and 1144 of VIPA 1140 is set at a specific value, the arrangement will be able to simultaneously compensate for dispersion in each channel. The thickness t which permits such simultaneous dispersion compensation is such that all of the wavelength components corresponding to the center wavelengths have the same output angle from VIPA 1140 and thus the same focusing position on mirror 1154. This is possible when the thickness t is set so that, for each channel, the round-trip optical length through VIPA 1140 traveled by the wavelength component corresponding to the center wavelength is a multiple of the center wavelength of each channel, that is, t is such that the quantity $2 \text{ nt} \cos \theta$ is an integer multiple of the center wavelength of each channel. This amount of thickness t will hereafter be referred to as the "WDM matching free spectral range thickness", or "WDM matching FSR thickness".

Therefore, in FIG. 12, with the thickness t set to the WDM matching FSR thickness, VIPA 1140 and focusing lens 1152 will cause (a) the wavelength component corresponding to the center wavelength of each channel to be focused at point 1270 on mirror 1154, (b) the wavelength component corresponding to the longer wavelength component of each channel to be focused at point 1272 on mirror 1154, and (c) the wavelength component corresponding to the shorter wavelength component of each channel to be focused at point 1274 on mirror 1154. Therefore, VIPA 1140 can be used to compensate for chromatic dispersion in all channels of a wavelength division multiplexed light. However, this VIPA-based dispersion-compensator does not compensate for dispersion slope.

Figure 13A:
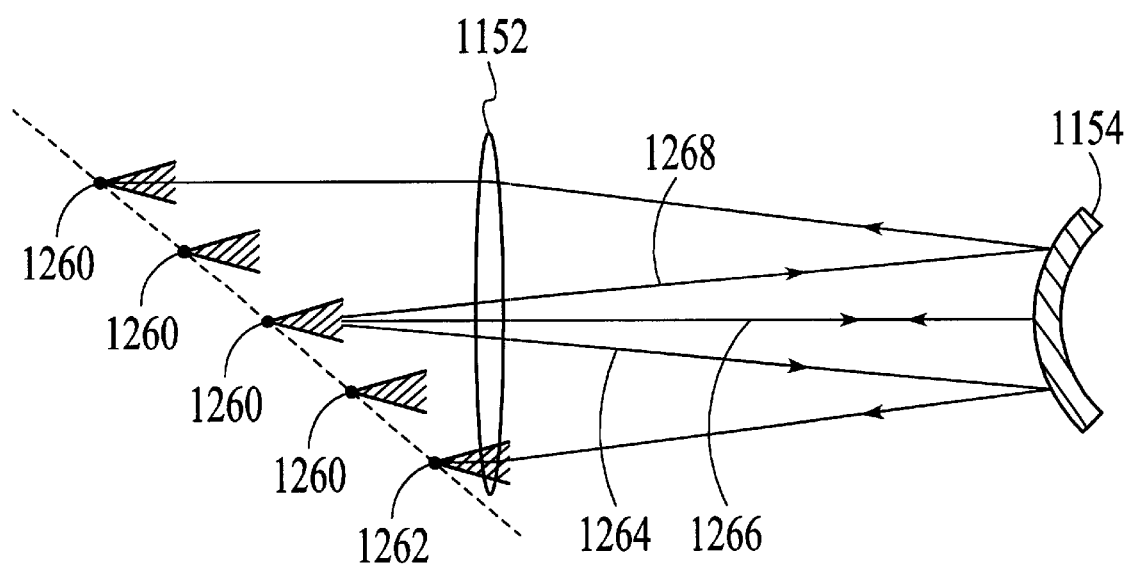
FIGS. 13a and 13b illustrate a second and a third preferred embodiment, respectively, of a partial-channel-set dispersion compensation device in accordance with the present invention.
Figure 13B:
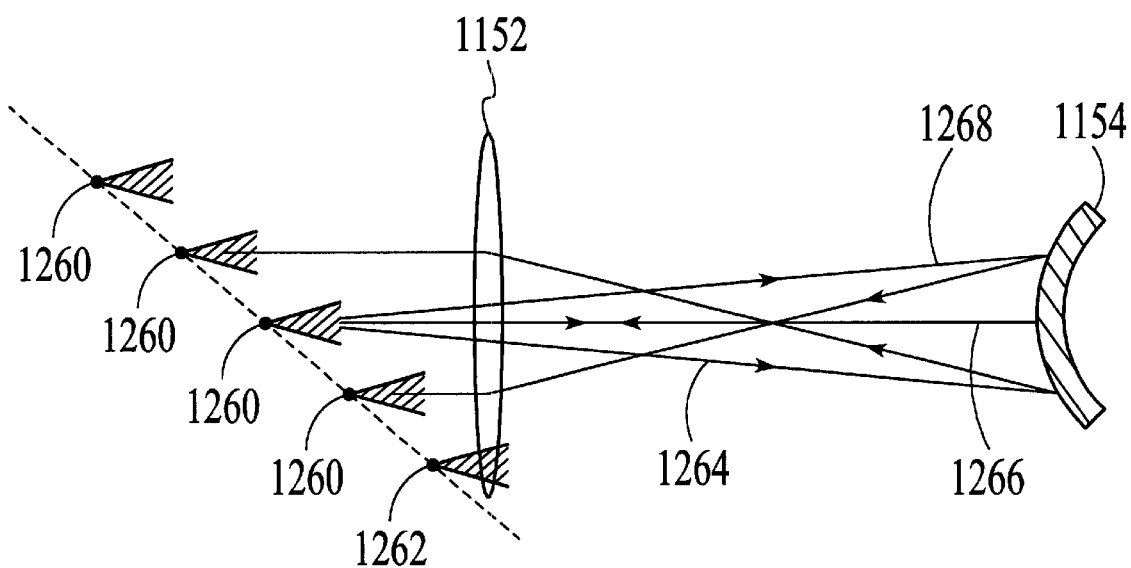

FIGS. 13a and 13b illustrate second and third preferred embodiments of a partial-channel-set dispersion compensation device in accordance with the present invention. In FIGS. 13a and 13b, there are illustrated the travel directions of a longer wavelength 1264, a center wavelength 1266 and a shorter wavelength 1268 of light emitted by a virtual image 1260 of beam waist 1262. In both FIGS. 13a and 13b, mirror 1154 is located at or near the focal point of focusing lens 1152. In FIG. 13a, mirror 1354 is a convex mirror. With a convex mirror, the beam shift is magnified. Therefore, a large chromatic dispersion can be obtained with a short lens focal length and a small amount of space. In FIG. 13b, mirror 1154 is a concave mirror. With a concave mirror, the sign of the dispersion is inverted.

With either the first or second preferred embodiments, where a flat mirror (FIG. 12) or a convex mirror (FIG. 13a)

is used, respectively, the light of "red" wavelengths of an optical signal travels a shorter distance through the partial-channel-set dispersion compensation device then does the light of "blue" wavelengths of the signal and, thus, negative chromatic dispersion is introduced into the signal. The second preferred embodiment is useful for compensating accumulated positive chromatic dispersion in an optical signal. With the third preferred embodiment, where a concave mirror (FIG. 13b) is used, the light of "red" wavelengths of an optical signal travels a greater distance through the partial-channel-set dispersion compensation device then does the light of "blue" wavelengths of the signal and, thus, positive chromatic dispersion is introduced into the signal. The magnitude and algebraic sign i.e., the concavity and convexity, of the curvature determines the magnitude and sign of the chromatic dispersion produced in the returned light. The third preferred embodiment is useful for compensating accumulated negative chromatic dispersion in an optical signal.

Figure 14:
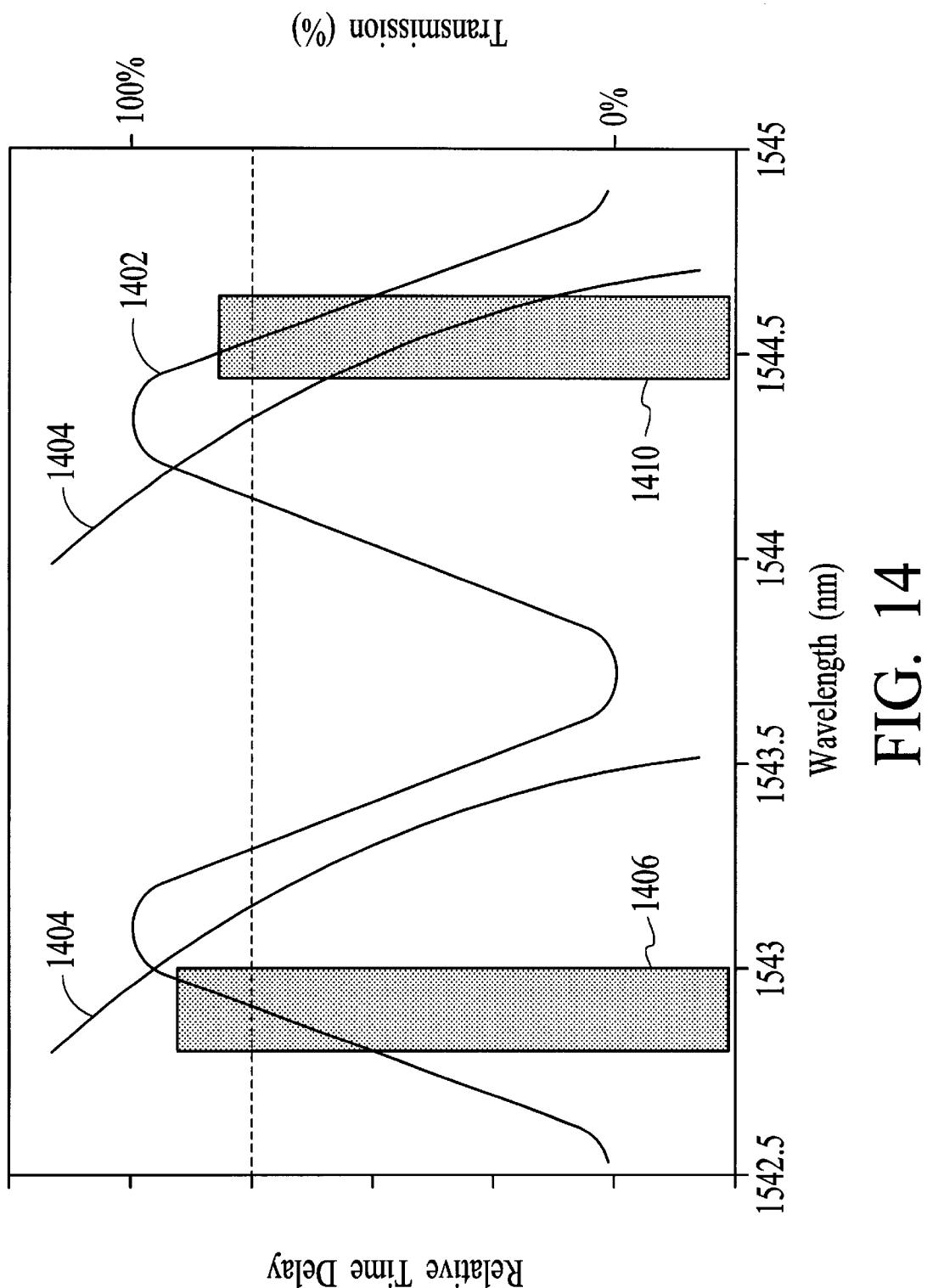
FIG. 14 is a graph of a transmissivity curve and a time delay curve for a preferred embodiment of a chromatic dispersion compensator in accordance with the present invention.

FIG. 14 is a graph of a transmissivity or pass bands curve 1402 and a time-delay curve 1404 for a preferred embodiment of a chromatic dispersion compensator in accordance with the present invention. The period of the transmissivity and time-delay of the partial-channel-set dispersion compensation devices 214a–214b is controlled so as to be approximately twice the inter-channel spacing, according to a 100-GHz spacing channel standard proposed by the International Telecommunications Union. The two shaded boxes shown in FIG. 14 represent the locations of two separate signal channels 1406 and 1410. The channels 1406 and 1410 are centered at the wavelengths 1542.94 nm and 1544.53 nm. Typical bandwidths of the two channels 1406 and 1410 are depicted by the widths of the shaded boxes. The heights of these shaded boxes do not have any physical significance. It is to be kept in mind that the periodic functions and the channels extend beyond the edges of the graphs towards both longer and shorter wavelengths in FIG. 14.

Only one half of the channels are directed to each partial-channel-set dispersion compensation devices 214a–214b, as previously illustrated in FIG. 2. For instance, only the first channel 1406 and the third channel 1410 are directed to and transmitted through the partial-channel-set dispersion compensation device 214a. These two channels are representative of a larger set channels comprising every second channel, where the set of channels may comprise either the "even" channels or the "odd" channels. The set of remaining channels (not shown) is directed to the second partial-channel-set dispersion compensation device 214b of the dispersion compensator 200. The second partial-channel-set dispersion compensation device 214b operates with a period similar to that illustrated in FIG. 14, except that the transmissivity and time delay curves are shifted so as to overlap with the channels of the remaining set of channels. The separation of channels into even and odd sets is performed by the interleaved channel separator 202 as illustrated in FIG. 2.

The transmissivity curve 1402 of the partial-channel-set dispersion compensation devices 214a–214b is a continuous periodic curve that regularly varies between 0% and $T_{max}\%$ transmission. The time-delay curve 1404 of the devices 214a–214b is a discontinuous periodic function with regular discontinuities at the wavelength positions of the transmission minima. This periodicity arises from the WDM matching FSR condition described above. Since, as described above, the operation of a VIPA is sensitive to the thickness of the material between the reflecting surfaces of the VIPA, the operational wavelengths of a VIPA can be precisely adjusted by controlling the temperature of the VIPA. Thus, varying the temperature of either or both VIPA's 204a–204b comprising the dispersion compensator 200 can control the wavelength period of the transmissivity and time-delay curves.

Each segment of the time delay curve 1404 represents transit time differences for wavelengths comprising a single channel through one of the partial-channel-set dispersion compensation devices 214a–214b. These transit time differences are referenced to the wavelengths at the center of each signal's pass band. In operation, such time delay curves can range between several tens of thousands of picoseconds positive or negative. The time delay curve 1404 shown in FIG. 14 represent negative chromatic dispersion introduced by the chromatic dispersion compensator in accordance with the present invention using a flat light returning device or mirror. Utilization of a convex mirror would yield a time delay curve whose segments would possess similar negative slope but a greater degree of curvature than those plotted. Utilization of a concave mirror would yield a time delay curve whose segments would possess positive slope and a high degree of curvature.

The difference in time delay between wavelengths at the short wavelength side and at the long wavelength side of any channel is represented by the difference in values of the time delay curve between the left and right side of any shaded box in FIG. 14. This time-delay difference is related to the chromatic dispersion introduced to the channel by the partial-channel-set dispersion compensation device 214a or 214b. The magnitude of the introduced chromatic dispersion is lesser in cases in which a channel band (represented by shaded boxes in FIG. 14) intersects or overlaps a shallow portion of the time-delay curve and greater in cases in which a channel band intersects a steep portion of the curve.

Under the operational conditions illustrated in FIG. 14, the wavelength regions of successive channels overlap regions of the time delay curve with progressively steeper slope, and thus non-constant chromatic dispersion may be introduced into the various channels. This dispersion slope compensation is possible because of the curvature in the repeated segments of the time delay curve. The utilization of a curved mirror 1154 (FIGS. 13a–13b) as one or both of the light returning devices 210a–21b (FIG. 2) would lead to greater curvature in the time delay curve segments and consequently greater dispersion slope compensation. However, with the present invention, the pass bands 1402 of each partial-channel-set dispersion compensation devices 214a–214b are significantly wider than the channel bandwidths. Therefore, no channels fall in regions of low transmissivity, outside the nominal pass bands. In this fashion, non-constant accumulated chromatic dispersion is compensated while an acceptable level of optical transmission is simultaneously maintained for all channels.

Figure 1:
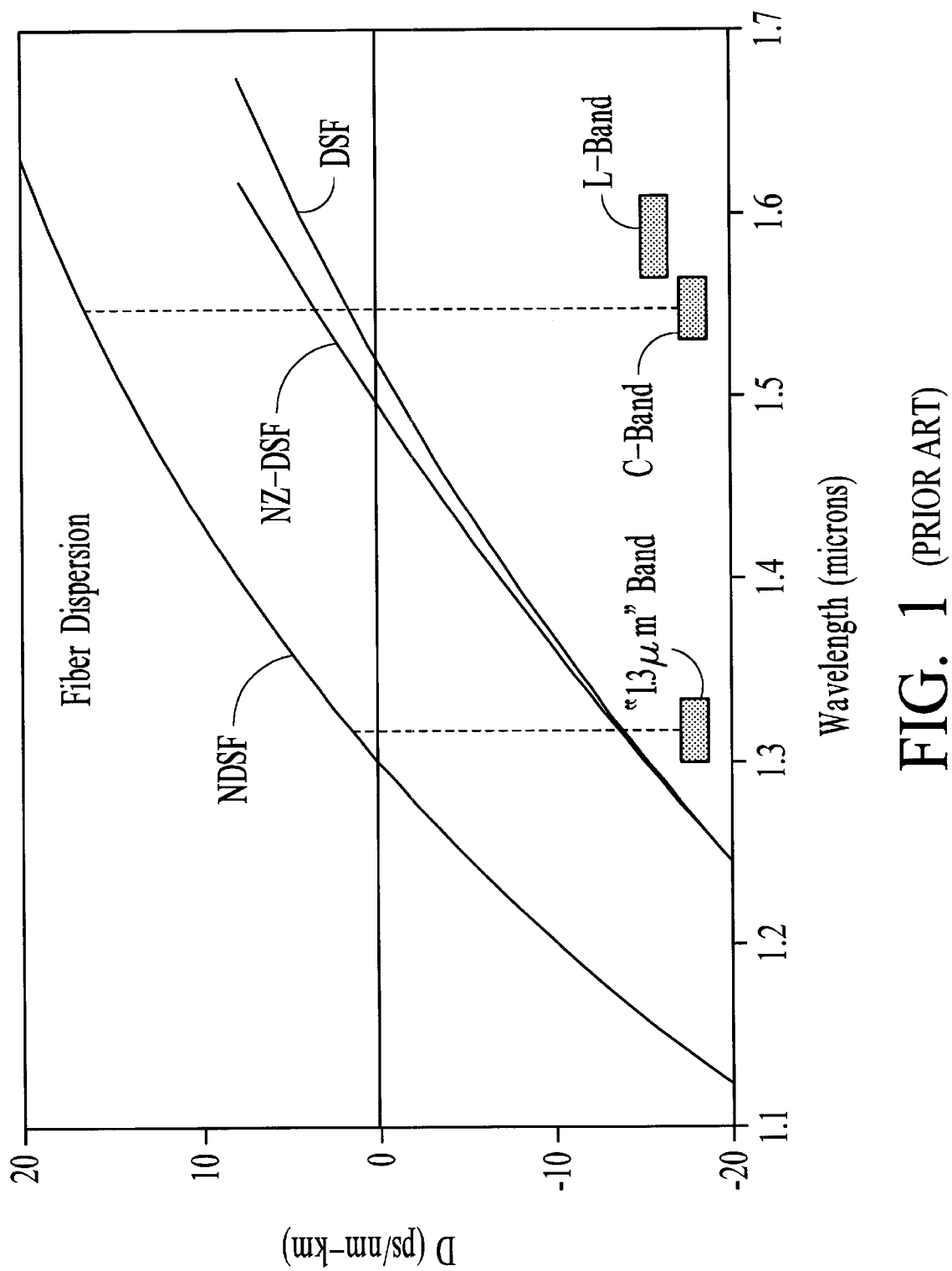
FIG. 1 illustrates the graphs of conventional dispersion characteristics against wavelength of conventional optical fiber types.

The versatility of the chromatic dispersion compensator in accordance with the present invention permits dense wavelength division multiplexed (DWDM) signals to be carried by optical communications systems comprised of fiber with either negative or near-zero dispersion coefficients. For instance, Dispersion Shifted Fiber (DSF) suffers from the potential deleterious side effects of four-wave mixing (FWM) and cross-phase modulation (XPM), which currently prevent its use for DWDM signal propagation in the wavelength region having near-zero dispersion. To avoid the effects of FWM and XPM phenomena, DWDM channels carried over DSF lines must be located at wavelengths sufficiently far from the zero-dispersion crossing point (see FIG. 1). If conventional dispersion compensation fiber is utilized to eliminate chromatic dispersion, such DWDM channels can only be carried over DSF on the long wavelength side of the zero-dispersion crossing point, since no dispersion compensation fiber is available to compensate for negative dispersion.

Figure 15:
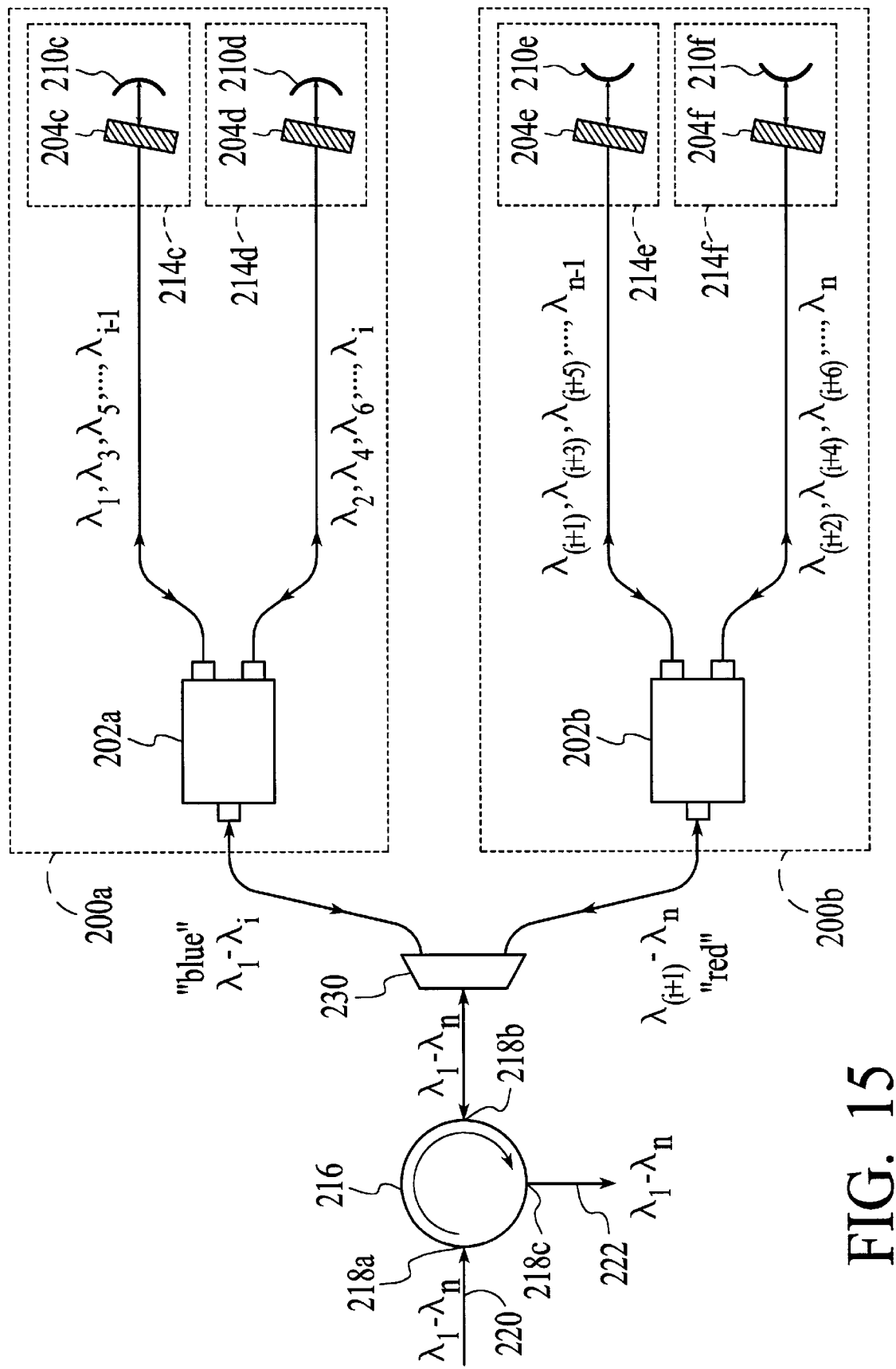
FIG. 15 illustrates a configuration of two chromatic dispersion compensators in parallel for both negative and positive dispersion compensation in accordance with the present invention.

By utilizing two instances of the chromatic dispersion compensator in accordance with the present invention in parallel with one another, both the negative dispersion and the positive dispersion of DSF fiber existing at wavelengths shorter and longer, respectively, than the zero dispersion point may be simultaneously compensated. FIG. 15 illustrates such a configuration by which both negative and positive dispersion may be simultaneously compensated in, for instance, DSF optical communications lines.

The configuration illustrated in FIG. 15 utilizes two instances of the present invention—a first dispersion compensator 200*a* and a second dispersion compensator 200*b*—in parallel with one another. For purposes of illustration, it is assumed that there are a total of n wavelength division multiplexed optical signal channels, denoted by $\lambda_1$–$\lambda_n$ where n is an integer. It is also assumed that these channels comprise two subsets of channels—a first subset denoted by $\lambda_1$–$\lambda_i$ within a first or relatively shorter wavelength band (i.e., a "blue" band) and a second subset denoted by $\lambda_{i+1}$–$\lambda_n$ within a second or relatively longer wavelength band (i.e., a "red" band). It is further assumed that each of the "red" and "blue" bands comprises an even number of channels and that the channels of the "blue" and "red" band contain accumulated negative and positive chromatic dispersion, respectively, which must be compensated.

As previously discussed herein, the optical signals $\lambda_1$–$\lambda_n$ containing unwanted chromatic dispersion are input to an optical circulator 216 from first optical communications line 220 through its first port 218*a*. These signals are then output from circulator 216 through its second port 218*b*. Prior to being input to either dispersion compensator 200*a* or 200*b*, the optical signals $\lambda_1$–$\lambda_n$ are passed through a course wavelength division multiplexer (CWDM) 230. The CWDM 230 separates the set of shorter-wavelength division multiplexed channels $\lambda_1$–$\lambda_i$ from the set of longer-wavelength division multiplexed channels $\lambda_{i+1}$–$\lambda_n$ and directs these two sets to the first 200*a* and second 200*b* dispersion compensators, respectively.

The first dispersion compensator 200*a* is comprised of two partial dispersion compensators 214*c*–214*d* utilizing concave light returning devices 210*c*–210*d* so as to add positive chromatic dispersion to the various signals input thereto. Conversely, the second dispersion compensator 200*b* is comprised of two partial dispersion compensators 214*e*–214*f* utilizing convex or flat light returning devices 210*e*–210*f* so as to add negative chromatic dispersion to the various signals input thereto.

Within the first dispersion compensator 200*a*, the "blue" channels received from CWDM 230 are separated by channel separator 202*a* into a first set of "odd" channel signals $\lambda_1, \lambda_3, \lambda_5, \ldots, \lambda_{i-1}$ and a first set of "even" channel signals $\lambda_2, \lambda_4, \lambda_6, \ldots, \lambda_i$. The partial dispersion compensators 214*c*–214*d* add positive chromatic dispersion to the signals $\lambda_1, \lambda_3, \lambda_5, \ldots, \lambda_{i-1}$ and $\lambda_2, \lambda_4, \lambda_6, \ldots, \lambda_i$ so as to compensate for accumulated negative chromatic dispersion therein. Subsequently, these two sets of channels are returned to and recombined by first channel separator 202*a* and thence returned to CWDM 230.

Within the second dispersion compensator 200*b*, the "red" channels received from CWDM 230 are separated by channel separator 202*b* into a second set of "odd" channel signals $\lambda_{i+1}, \lambda_{i+3}, \lambda_{i+5}, \ldots, \lambda_{n-1}$ and a second set of "even" channel signals $\lambda_{i+2}, \lambda_{i+4}, \lambda_{i+6}, \ldots, \lambda_n$. The partial dispersion compensators 214*e*–214*f* add negative chromatic dispersion to the signals $\lambda_{i+1}, \lambda_{i+3}, \lambda_{i+5}, \ldots, \lambda_{n-1}$ and $\lambda_{i+2}, \lambda_{i+4}, \lambda_{i+6}, \ldots, \lambda_n$ so as to compensate for accumulated positive chromatic dispersion therein. Subsequently, these two sets of channels are returned to and recombined by second channel separator 202*b* and thence returned to CWDM 230.

The dispersion compensated "blue" channels $\lambda_1$–$\lambda_i$ and dispersion compensated "red" channels $\lambda_{i+1}$–$\lambda_n$ returned, respectively, by first dispersion compensator 200*a* and second dispersion compensator 200*b* to CWDM 230 are recombined by CWDM 230 into the dispersion compensated channels $\lambda_1$–$\lambda_n$. This full set of dispersion compensated channels is then input to the second port 218*b* of the optical circulator 216 from whence it is transferred to the second optical communications line 222 via the third port 218*c*. By this means, the chromatic dispersion compensator illustrated in FIG. 15 compensates the negative chromatic dispersion accumulated in the "blue" channels and simultaneously compensates the positive chromatic dispersion accumulated in the "red" channels.

An improved chromatic dispersion compensator is disclosed. The preferred embodiment of the chromatic dispersion compensator in accordance with the present invention includes an interleaved channel separator optically coupled in cascade arrangement to each of two partial-channel-set dispersion compensation devices, where each of the latter two devices comprises a temperature-tuned Virtually Imaged Phased Array (VIPA) optically coupled to a light returning mechanism. The interleaved channel separator receives a plurality of channels containing undesired chromatic dispersion and separates the plurality of channels into a first set of channels and a second set of channels. The first and second sets of channels are directed to a first and a second VIPA-based partial-channel-set dispersion compensation device, respectively, where the pass band of each of the devices is approximately twice the inter-channel spacing. The first and a second VIPA-based partial-channel-set dispersion compensation devices return the first and second channel sets to the channel separator, which re-combines or multiplexes the two channel sets. The controlled difference between the periodicity of each VIPA's group delay response and the periodicity of the channel spacing causes the light of each channel input to the VIPA to acquire a different value of chromatic dispersion from that of every other channel input to the same VIPA. This controlled difference in chromatic dispersion acquired by each channel is utilized so as to compensate dispersion slope. Advantages in using the chromatic dispersion compensator in accordance with the present invention includes tunability, adaptability to various fiber types or optical transmission regions with either positive or negative dispersion, smaller size and lower cost. Also, the present invention provides the capability of simultaneously providing different values of dispersion compensation to different channels—that is, it is capable of correcting for dispersion slope. The greater transmission function periodicity of each VIPA, as compared to the two output ports of the channel separator, permits each partial-channel-set dispersion compensation device to have an adequate range of dispersion compensating capability for dispersion slope compensation.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A chromatic dispersion compensator, comprising:
a channel separator for separating a wavelength division multiplexed light comprising a plurality of channels into a plurality of partial channel sets interleaved with one another, the plurality of channels containing undesired chromatic dispersion and dispersion slope; and
a plurality of partial-channel-set dispersion compensation devices optically coupled to the channel separator in a cascade arrangement, wherein each partial-channel-set dispersion compensation device comprises:
a virtually imaged phased array (VIPA) optically coupled to the channel separator, and
a light returning device optically coupled to the VIPA, wherein a combination of the VIPA and the light returning device compensates for the undesired chromatic dispersion and dispersion slope by propagating each wavelength of the plurality of channels along a different path length.

2. The compensator of claim 1, wherein the VIPA spatially disperses each wavelength of the plurality of channels, and outputs the spatially dispersed wavelengths to the light returning device.

3. The compensator of claim 1, wherein the light returning device comprises a reflective surface, wherein the reflective surface reflects spatially dispersed wavelengths from the VIPA back to the VIPA, wherein a magnitude and an algebraic sign of a curvature of the reflective surface determines a magnitude and a sign of chromatic dispersion produced in the reflected spatially dispersed wavelengths.

4. A chromatic dispersion compensator, comprising:
a channel separator, comprising:
an input port for receiving a wavelength division multiplexed light comprising a plurality of channels, the plurality of channels containing undesired chromatic dispersion and dispersion slope, wherein the plurality of channels is separated into a first set of channels and a second set of channels interleaved with the first set of channels,
a first output port for outputting the first set of channels, and
a second output port for outputting the second set of channels;
a first partial-channel-set dispersion compensation device, comprising:
a first VIPA optically coupled to the first output port, and
a first light returning device optically coupled to the first VIPA, wherein a combination of the first VIPA and the first light returning device compensated for the undesired chromatic dispersion and dispersion slope by propagating each wavelength of the first set of channels along a different path length; and
a second partial-channel-set dispersion compensation device, comprising a second VIPA optically coupled to the second output port, and a second light returning device optically coupled to the second VIPA, wherein a combination of the second VIPA and the second light returning device compensated for the undesired chromatic dispersion and dispersion slope by propagating each wavelength of the second set of channels along a different path length.

5. The compensator of claim 4, wherein the first VIPA spatially disperses each wavelength of the first set of channels, and outputs the spatially dispersed wavelengths to the first light returning device,
wherein the second VIPA spatially disperses each wavelength of the second set of channels, and outputs the spatially dispersed wavelengths to the second light returning device.

6. The compensator of claim 4, wherein the first light returning device comprises
a first reflective surface, wherein the first reflective surface reflects spatially disperses wavelengths from the first VIPA back to the first VIPA, wherein a magnitude and an algebraic sign of a curvature of the first reflective surface determines a magnitude and a sign of chromatic dispersion produced in the reflected spatially dispersed wavelengths from the first VIPA,
wherein the second light returning device comprises a second reflective surface, wherein the second reflective surface reflects spatially dispersed wavelengths from the second VIPA back to the second VIPA, wherein a magnitude and an algebraic sign of a curvature of the second reflective surface determines a magnitude and a sign of chromatic dispersion produced in the reflected spatially dispersed wavelengths from the second VIPA.

7. A method for compensating for chromatic dispersion in a fiber communications system, comprising the steps of:
(a) receiving a wavelength division multiplexed light comprising a plurality of channels containing undesired chromatic dispersion and dispersion slope;
(b) separating the plurality of channels into a first set of channels and a second sets of channels interleaved with the first set of channels, wherein the first and second sets of channels are propagated along different paths;
(c) compensating for the undesired chromatic dispersion and dispersion slope by propagating each wavelength of the first and second sets of channels along a different path length; and
(d) combining the first and second sets of dispersion compensated channels into a plurality of dispersion compensated channels.

8. The method of claim 7, wherein the compensating step (c) comprises:
(c1) receiving the first and second set of channels;
(c2) spatially dispersing each wavelength of the first and the second set of channels; and
(c3) reflecting the spatially dispersed wavelength of the first and second sets of channels such that each wavelength is propagated along a different path so as to compensate for the chromatic dispersion and dispersion slope.

9. The method of claim 7, wherein the combining step (d) comprises:
(d1) combining the first and the second set of dispersion compensated channels into the single plurality of dispersion compensated channels.

10. A method for compensating for chromatic dispersion in a fiber communications system, comprising the steps of:
(a) receiving a wavelength division multiplexed light comprising a plurality of channels containing undesired chromatic dispersion and dispersion slope;
(b) separating the plurality of channels into a first set of channels and a second set of channels interleaved with the first set of channels, wherein the first and second sets of channels are propagated along different paths;
(c) spatially dispersing each wavelength of the first and the second set of channels;

(d) reflecting the spatially dispersed wavelength of the first and second sets of channels such that each wavelength is propagated along a different path so as to compensate for the chromatic dispersion and dispersion slope; and (e) combining the sets of dispersion compensated channels into a plurality of dispersion compensated channels.

11. The method of claim 10, wherein the reflecting step (d) comprises:

(d1) reflecting the spatially dispersed wavelength of the first and second sets of channels utilizing a light returning device comprising a concave surface, such that each wavelength is propagated along a different path so as to compensate for a negative chromatic dispersion and dispersion slope.

12. The method of claim 11, wherein the first and second sets of channels are carried in Dispersion Shifted Fiber (DSF) in a vicinity of a 1.3 micron wavelength band.

13. The method of claim 10, wherein the combining step (e) comprises:

(e1) combining the first and the second set of dispersion compensated channels into the single plurality of dispersion compensated channels.

14. A method for compensating for chromatic dispersion in a fiber communications system, comprising the steps of:

(a) receiving a wavelength division multiplexed light comprising a plurality of channels containing undesired chromatic dispersion and dispersion slope, the plurality of channels being carried in DSF in a vicinity of a 1.3 micron wavelength band;

(b) separating the plurality of channels into a first set of channels and a second set of channels interleaved with the first set of channels, wherein the first and second sets of channels are propagated along different paths;

(c) spatially dispersing each wavelength of the first and the second set of channels;

(d) reflecting the spatially dispersed wavelength of the first and second sets of channels utilizing a light returning device comprising a concave surface, such that each wavelength is propagated along a different path so as to compensate for a negative chromatic dispersion and dispersion slope; and (e) combining the sets of dispersion compensated channels into a plurality of dispersion compensated channels.

15. A fiber communications system, comprising:

a plurality of optical couplings; and a chromatic dispersion compensator optically coupled to at least one of the plurality of optical couplings, the chromatic dispersion compensator comprising:

a channel separator for separating a wavelength division multiplexed light comprising a plurality of channels into a plurality of partial channel sets interleaved with one another, the plurality of channels containing undesired chromatic dispersion and dispersion slope; and a plurality of partial-channel-set dispersion compensation devices optically coupled to the channel separator in a cascade arrangement, wherein each partial-channel-set dispersion compensation device comprises:

a virtually imaged phased array (VIPA) optically coupled to the channel separator, and a light returning device optically coupled to the VIPA at a side opposite to the channel separator, wherein a combination of the VIPA and the light returning device compensates for the undesired chromatic dispersion and dispersion slope by propagating each wavelength of the plurality of channels along a different path length.

16. An optical fiber communications system, comprising:

an optical circulator; and a chromatic dispersion compensator optically coupled to the optical circulator, the chromatic dispersion compensator comprising:

a channel separator for separating a wavelength division multiplexed light comprising a plurality of channels into a plurality of partial channel sets interleaved with one another, the plurality of channels containing undesired chromatic dispersion and dispersion slope; and a plurality of partial-channel-set dispersion compensation devices optically coupled to the channel separator in a cascade arrangement, wherein each partial-channel-set dispersion compensation device comprises:

a virtually imaged phased array (VIPA) optically coupled to the channel separator, and a light returning device optically coupled to the VIPA, wherein a combination of the VIPA and the light returning device compensates for the undesired chromatic dispersion and dispersion slope by propagating each wavelength of the plurality of channels along a different path length.

* * * * *